(12) United States Patent
Patil et al.

(10) Patent No.: US 11,784,325 B2
(45) Date of Patent: Oct. 10, 2023

(54) FRAMELESS FUEL CELL STACK HAVING HOLLOW FASTENERS

(71) Applicant: NISSAN NORTH AMERICA, INC., Franklin, TN (US)

(72) Inventors: Sandeep Patil, Farmington Hills, MI (US); Mohammed Hussain Abdul Jabbar, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 22 days.

(21) Appl. No.: 17/491,434

(22) Filed: Sep. 30, 2021

(65) Prior Publication Data

US 2023/0096918 A1    Mar. 30, 2023

(51) Int. Cl.
| | |
|---|---|
| *H01M 8/247* | (2016.01) |
| *H01M 8/248* | (2016.01) |
| *H01M 8/026* | (2016.01) |
| *H01M 8/0245* | (2016.01) |
| *H01M 8/0282* | (2016.01) |
| *H01M 8/1213* | (2016.01) |
| *H01M 8/0276* | (2016.01) |
| *H01M 8/025* | (2016.01) |
| *H01M 8/12* | (2016.01) |

(52) U.S. Cl.
CPC .......... *H01M 8/026* (2013.01); *H01M 8/025* (2013.01); *H01M 8/0245* (2013.01); *H01M 8/0276* (2013.01); *H01M 8/0282* (2013.01); *H01M 8/1213* (2013.01); *H01M 2008/1293* (2013.01)

(58) Field of Classification Search
CPC .............. H01M 8/02; H01M 8/1213; H01M 2008/1293; H01M 8/2465–2483
See application file for complete search history.

(56) References Cited

U.S. PATENT DOCUMENTS

| | | | |
|---|---|---|---|
| 7,833,667 B2 | 11/2010 | Gerritse et al. | |
| 8,329,358 B2 | 12/2012 | Peng et al. | |
| 2016/0190604 A1 | 6/2016 | Evans et al. | |
| 2016/0293980 A1* | 10/2016 | Morikawa | H01M 8/2483 |
| 2016/0372778 A1* | 12/2016 | Hotta | H01M 8/0271 |

FOREIGN PATENT DOCUMENTS

| | | |
|---|---|---|
| CN | 103985886 A | 8/2014 |
| CN | 112072134 A | 12/2020 |
| EP | 3016192 A1 | 5/2016 |

* cited by examiner

*Primary Examiner* — James Lee
(74) *Attorney, Agent, or Firm* — Global IP Counselors, LLP

(57) ABSTRACT

A fuel cell stack is provided that includes a top end plate, a bottom end plate, a plurality of fuel cells provided between the top end plate and the bottom end plate, at least one bipolar plate, a plurality of hollow fasteners, and a plurality of sleeves. Each of the at least one bipolar plate is formed between two of the plurality of fuel cells. The plurality of hollow fasteners and the plurality of sleeves extend through holes in each of the top end plate, the bottom end plate, the plurality of fuel cells and the at least one bipolar plate. Each of the plurality of sleeves surrounds one of the plurality of hollow fasteners. Each of the plurality of hollow fasteners comprises a top surface, a hole in the top surface, a side surface, and a plurality of holes formed in the side surface.

19 Claims, 8 Drawing Sheets

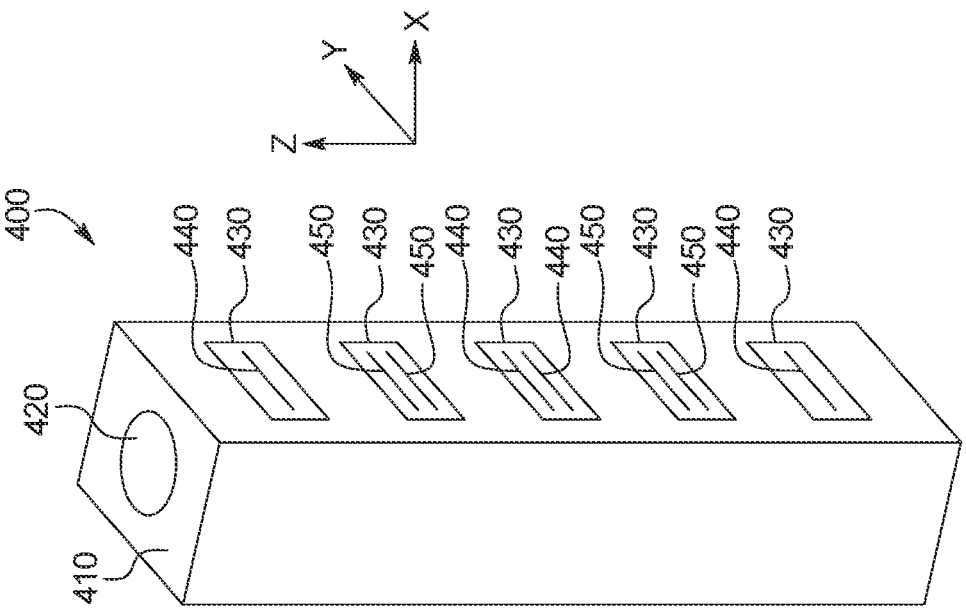
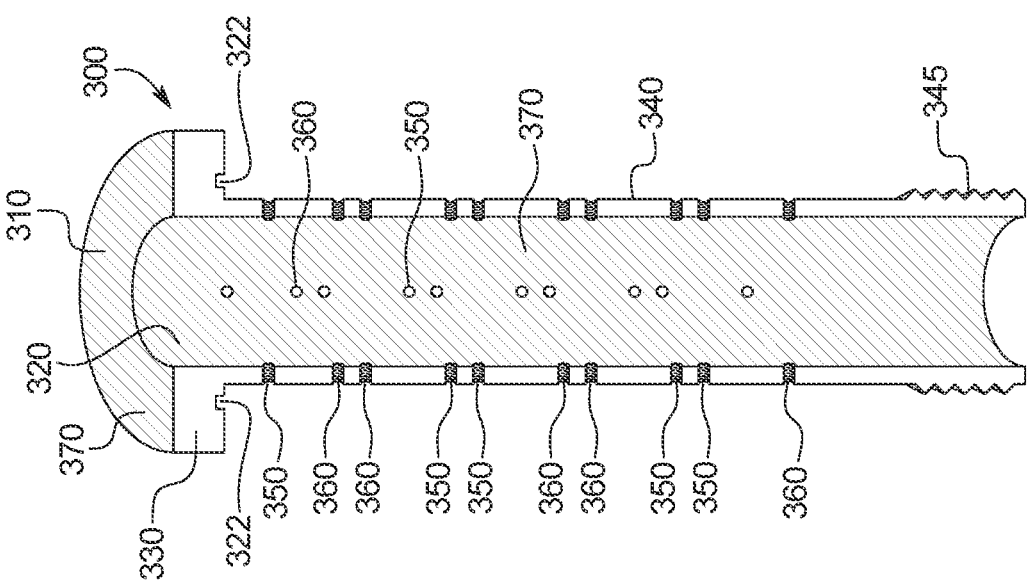

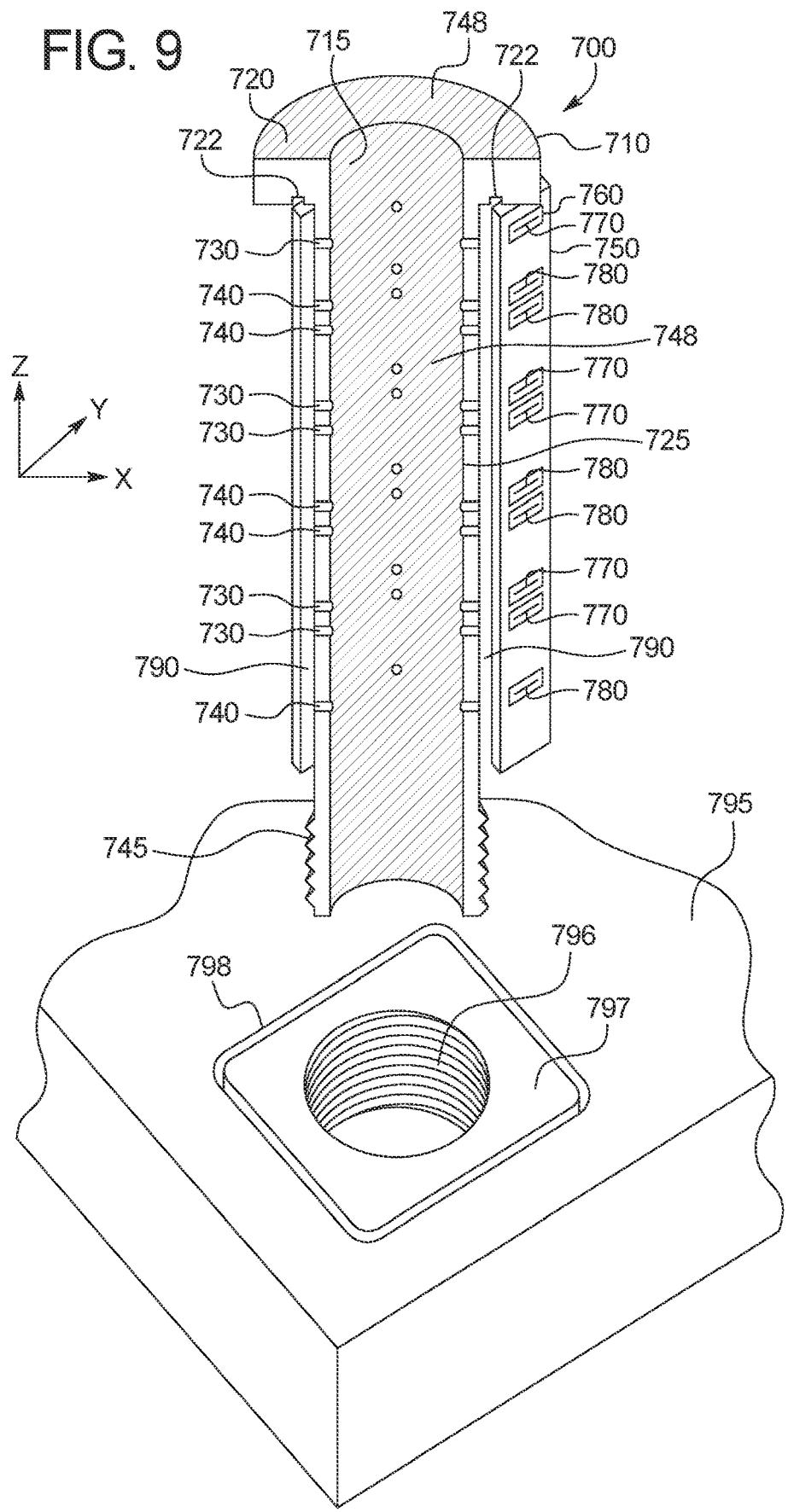

FRAMELESS FUEL CELL STACK HAVING HOLLOW FASTENERS

BACKGROUND

Field of the Invention

The present invention generally relates to hollow fasteners for gas distribution in a solid oxide fuel cell stack, and a frameless fuel cell stack including the hollow fasteners. The fuel cell stack includes a top end plate, a bottom end plate, a plurality of fuel cells provided between the top and bottom end plates, at least one bipolar plate, a plurality of hollow fasteners and a plurality of sleeves. Each of the at least one bipolar plate is formed between two of the plurality of fuel cells. The hollow fasteners extend through holes in each of the top end plate, the bottom end plate, the plurality of fuel cells and the at least one bipolar plate. The sleeves extend through the holes in each of the top end plate, the bottom end plate, the plurality of fuel cells and the at least one bipolar plate. Each of the sleeves surrounds one of the hollow fasteners. Each of the hollow fasteners has a top surface, a hole in the top surface, a side surface, and a plurality of holes formed in the side surface.

Background Information

Solid oxide fuel cells ("SOFC") are desirable because they have combined high heat and power efficiency, generate low emissions and have a relatively low cost. However, SOFCs require a high operating temperature in order for oxygen ions to conduct, so they undesirably require longer start-up times and have mechanical and chemical compatibility issues. Furthermore, conventional SOFCs are very heavy due to conventional thick ceramic anode supports and therefore cannot be used in applications such as drones and electric vehicles ("EV"). Conventional SOFCs are also made of ceramics, so they are brittle and could break when a drone lands or during harsh driving conditions.

In order to improve the strength of SOFCs, metal-supported SOFCs have been provided in which the anode of the fuel cell is supported by a metal substrate. However, conventional metal-supported SOFC stacks are very heavy due to the thickness required for the metal substrate. Furthermore, for applications in which multiple fuel cells are needed to generate a high amount of power, a frame is conventionally used to hold the cells together, and the use of the frame undesirably increase the overall weight of the fuel cell stack. Thus, such fuel cell stacks cannot be used in applications such as drones or EVs where very thin and lightweight cells are required to achieve high volumetric power density. Conventional metal-supported SOFCs also have sealing issues due to the use of adhesives for stacking of the electrolyte and the anode on metal bipolar plates.

Therefore, further improvement is needed to reduce the thickness, weight and overall dimensions of metal-supported SOFC stacks while maintaining sufficient strength and sealing of the cell stack. In particular, it is desirable to provide a frameless SOFC stack in which the fuel cells can be secured without the use of an exterior frame. By providing a frameless SOFC stack in which gas is distributed through hollow fasteners that extend through holes in the individual SOFC cells, a simpler design can be achieved for the fuel cell stack, thereby reducing the weight and dimensions of the cell stack. Furthermore, by allowing gas distribution through the hollow fasteners, the gas distribution of the cell stack can be improved while maintaining sufficient sealing of the cell stack without adversely affecting the strength or other properties of the metal-supported SOFC stack. In particular, the use of the hollow fasteners can guide gas to the cell active area, thereby decreasing the gas diffusion resistances in the cell stack. The hollow fasteners can also hold multiple cells without requiring the use of adhesives, thereby eliminating the undesirable sealing issues with conventional metal-supported SOFCs.

SUMMARY

It has been discovered that the thickness and weight of the metal-supported SOFC stack can be reduced by providing a frameless cell stack design in which the cells are secured using hollow fasteners that are drilled through the cells themselves. The hollow fasteners each have a hole in the top that extends down a center axis of the fastener, and holes in the side to allow for gas distribution to the individual cells in the fuel cell stack. Furthermore, the hollow fasteners are surrounded by insulating sleeves that also have channels to allow for gas distribution to the cells. The hollow fasteners and sleeves extend through holes in the fuel cells themselves and, thus, the use of an external frame can be avoided.

In particular, it has been discovered that hollow fasteners with gas flow channels formed therein can be incorporated into a metal-supported SOFC stack to reduce the overall thickness and weight of the fuel cell stack while still maintaining sufficient strength and sealing of the fuel cells. By providing the hollow fasteners to extend through holes in the top end plate, the bottom end plate, the plurality of fuel cells and the bipolar plates, the fuel cells in the stack can be secured together without the use of an exterior frame. Furthermore, by providing a gas flow channel down the center axis of the hollow fasteners and holes in the sides of the hollow fasteners, the gas flow distribution of the cell stack can be improved. Thus, it is desirable to provide a frameless fuel cell stack that includes such hollow fasteners.

In view of the state of the known technology, one aspect of the present disclosure is to provide a fuel cell stack comprising: a top end plate, a bottom end plate, a plurality of fuel cells, at least one bipolar plate, a plurality of hollow fasteners, and a plurality of sleeves. The plurality of fuel cells is provided between the top end plate and the bottom end plate. Each of the at least one bipolar plate is formed between two of the plurality of fuel cells. The plurality of hollow fasteners and the plurality of sleeves each extend through holes in each of the top end plate, the bottom end plate, the plurality of fuel cells and the at least one bipolar plate. Each of the plurality of sleeves surrounds one of the plurality of hollow fasteners. Each of the plurality of hollow fasteners comprises: a top surface, a hole in the top surface, a side surface, and a plurality of holes formed in the side surface.

Another aspect of the present disclosure is to provide a screw for a fuel cell stack. The screw comprises a metal screw having an exterior surface, and an insulating coating formed on the exterior surface of the metal screw. The metal screw has a gas flow channel formed along a center axis of the metal screw. The metal screw also has a plurality of holes formed in the exterior surface, the plurality of holes connecting the gas flow channel to an exterior of the metal screw.

By forming a gas flow channel along a center axis of the hollow fasteners and in holes along the side surface of the hollow fasteners, the gas distribution to the fuel cells can be improved by the gas flowing down to the cells through the top of the hollow fasteners. In particular, the gas can be more directly distributed to each of the fuel cells in the stack as compared with conventional gas distribution systems that involve the use of an exterior frame, thereby improving the gas flow distribution in the fuel cell stack and the overall performance of the fuel cell stack.

Furthermore, conventional metal-supported SOFC stacks include an exterior frame that is used to secure the fuel cells when they are stacked. In contrast, by providing a fuel cell stack in which the cells are secured together by penetrating the hollow fasteners through the end plates and the fuel cells themselves, the use of an exterior frame can be avoided, thereby reducing the thickness and weight of the cell stack while still allowing for many cells to be included to ensure sufficient power generation. For example, at least 100 cells can be included in the fuel cell stack while maintaining a total thickness of only 2-3 mm for the entire fuel cell stack.

BRIEF DESCRIPTION OF THE DRAWINGS

Referring now to the attached drawings which form a part of this original disclosure:

FIG. 5 is a cross-sectional view of a hollow fastener according to an embodiment;

FIG. 6 is a perspective view of a sleeve according to an embodiment;

FIG. 9 is a perspective view of a hollow fastener surrounded by a sleeve and a bottom end plate according to an embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
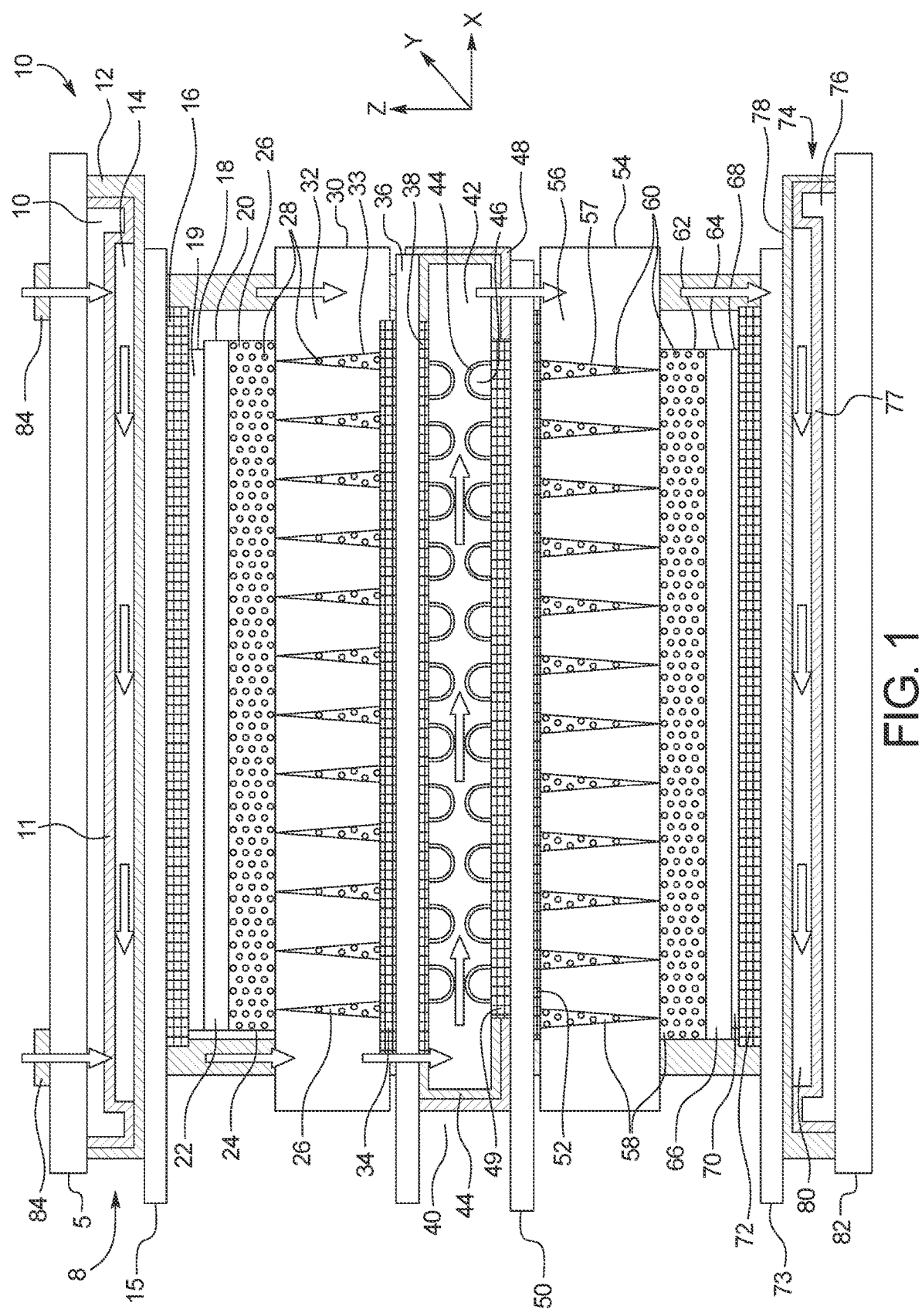
FIG. 1 is a cross-sectional view of a fuel cell stack including hollow fasteners according to one embodiment.

Referring initially to FIG. 1, a solid oxide fuel cell stack 1 is provided in accordance with a first embodiment. The solid oxide fuel cell stack 1 includes two alternately disposed fuel cells that are stacked so as to face each other and form a single repeating unit. However, it should be understood that the solid oxide fuel cell stack 1 can include several fuel cells in order to generate enough power for a given application. In particular, the solid oxide fuel cell stack can include enough fuel cells to generate 100 kW of energy, preferably at least 100 fuel cells. The solid oxide fuel cell stack 1 can be incorporated in a drone, an electric vehicle, a combined heat-generating and power-generating device, or any other suitable mobile device.

The fuel cell stack 1 includes a top end plate 5 that acts as a current collector. The top end plate 5 is a metal plate formed of, for example, stainless steel, preferably a SS 440 series metal. The top end plate 5 has a width in the X-direction that is greater than the width of an air side bipolar plate 8. The width of the top end plate 5 in the X-direction that ranges from 10 cm to 30 cm. The top end plate 5 has a length in the Y-direction of 10 cm to 60 cm and a thickness in the Z-direction ranging from 0.3 cm to 1 cm.

The top end plate 5 is coated with a sealant. The sealant is an insulating material for sealing the fuel cell stack 1 and preferably includes a YSZ ceramic material. The sealant can also contain glass to prevent fusion at low temperatures of less than 700° C. However, it should be understood that any suitable insulating material may be used as the sealant, as long as the insulating material can be coated on the metal top end plate 5 at a temperature of less than 700° C. For example, the sealant can include at least one of: silicate glass, a silicate/glass-ceramic, a Ba—Al—B—La silicate/glass-ceramic, and a Sr—Ca—B—Zn—Ti silicate glass-ceramic. The sealant has a thickness of approximately 10 μm to 20 μm.

The fuel cell stack 1 also includes a bipolar plate 8. The bipolar plate 8 includes a metal plate 10, a first coating 11, a second coating 12, and a plurality of semi-circular channels 14 formed on the bottom surface of the metal plate 10. Although not shown in the cross-sectional view, the plurality of semi-circular channels 14 extend along the bottom surface of the metal plate 10 in the X-direction such that air flows in the X-direction along the semi-circular channels 14. However, as shown in FIG. 1, the semi-circular channels 14 do not extend along the entire width of the metal plate 10 in the X-direction. The metal plate 10 can be any suitable metal for a bipolar plate. For example, the metal plate can be formed of a stainless steel material, such as SS 330, SS 441 or Crofer 22, preferably SS 441. A total width of the bipolar plate 8 in the X-direction, including the first coating 11 and the second coating 12, ranges from 10 cm to 50 cm, and is preferably 20 cm. The thickness of the bipolar plate 8 in the Z-direction ranges from 500 μm to 800 μm, and a length of the bipolar plate 8 in the Y-direction ranges from 10 cm to 50 cm, preferably 40 cm.

The metal plate 10 is covered by a first coating 11. The first coating 11 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 1. For example, the first coating 11 can include at least one Cu—Mn based spinel, such as $CuNi_{0.2}Mn_{1.8}O_4$, or at least one Mn—Co based spinel, such as $MnCo_2O_4$.

As shown in FIG. 1, the first coating 11 covers a part of the top surface of the metal plate 10, a part of the bottom surface of the metal plate 10 including the semi-circular channels 14, and both edges or side surfaces of the metal plate 10. The first coating 11 is dense and has a thickness of approximately 1 μm to 10 μm. However, it should be understood that the first coating 11 can cover the entire metal plate 10 or can cover only the semi-circular channels 14, as long as the first coating 11 covers at least the entirety of the semi-circular channels 14.

Alternatively, the first coating 11 can be a bi-layer coating including a bottom layer closer to the surface of the metal plate 10 that includes the non-metal oxide coating, and a top or outer layer that includes a reforming catalyst. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 μm to 50 μm, and the non-metal oxide layer has a thickness of approximately 1 μm to 10 μm. By providing the reforming catalyst layer on the metal plate 10, the compatibility of the solid oxide fuel cell stack 1 with various types of fuels can be improved. For example, by changing the reforming catalyst, the types of fuels used with the solid oxide fuel cell stack 1 can also advantageously be changed.

The semi-circular channels 14 are formed as cavities in the bottom surface of the metal plate 10. The semi-circular channels 14 each have a width or diameter of approximately 10 μm to 500 μm, preferably 100 μm to 250 μm, in the Y-direction. The semi-circular channels 14 each have a height of approximately 10 μm to 500 μm, preferably 100 μm to 250 μm, in the Z-direction.

The semi-circular channels 14 are spaced apart on the bottom surface of the metal plate 10 at regular intervals of approximately 10 μm to 500 μm, preferably 100 μm to 250 μm, between each of the semi-circular channels 14 in the Y-direction. However, it should be understood that the semi-circular channels 14 can include only one channel or can be formed at irregular intervals along the bottom surface of the metal plate 10 in the Y-direction. As shown in FIG. 1, air flows along the semi-circular channels 14 in the X-direction.

The second coating 12 is an insulating material that seals the metal plate 10. The second coating 12 preferably includes a YSZ ceramic. The second coating 12 can also contain glass to prevent fusion at low temperatures of less than 700° C. Any suitable insulating material may be used as the second coating 12, as long as the insulating material can be coated on the metal plate 10 at a temperature of less than 700° C. For example, the second coating 12 can include at least one of: silicate glass, a silicate/glass-ceramic, a Ba—Al—B—La silicate/glass-ceramic, and a Sr—Ca—B—Zn—Ti silicate glass-ceramic. The second coating 12 has a thickness of approximately 10 μm to 20 μm.

The solid oxide fuel cell stack 1 also includes a positive electrode terminal 15. As shown in FIG. 1, the positive electrode terminal 15 is in contact with the second coating 12 on the bipolar plate 8. The positive electrode terminal 15 is formed of any suitable metal. For example, the positive electrode terminal 15 can be formed of copper or a stainless steel material such as Crofer. The positive electrode terminal 15 has a frame-like shape with a rectangular-shaped hole formed in the center thereof to allow air to flow from the semi-circular channels 14 to a cathode 18 of a first fuel cell. The positive electrode terminal 15 has a lead that protrudes from the cell stack 1 with a width in the X-direction of approximately 1 cm to 2 cm. The positive electrode terminal 15 also has a length in the Y-direction of approximately 3 cm to 15 cm and a thickness in the Z-direction of approximately 0.01 cm to 0.3 cm. It should be understood that the positive electrode terminal 15 has any suitable shape and dimensions such that air can flow from the semi-circular channels 14 to the cathode 18.

The solid oxide fuel cell stack 1 includes a mesh current collector 16 in contact with both the positive electrode terminal 14 and the cathode 18 of the first fuel cell. The first fuel cell includes the cathode 18, an electrolyte 20, an anode 24 and a metal substrate 30. The mesh current collector 16 is formed of a suitable metal for making electrical contact between the positive electrode terminal 14 and the cathode 18. For example, the mesh current collector 16 is preferably formed of nickel or copper. The mesh current collector 16 has a grid-like pattern with square- or rectangular-shaped holes between portions of the metal. The mesh current collector 16 has a thickness in the Z-direction of approximately 30-50 μm. The mesh current collector 16 has a length in the Y-direction and a width in the X-direction that are less than the length and width of the positive electrode terminal 14, respectively.

The cathode 18 includes a cathode material 19. The cathode 18 has a thickness of 20-30 μm in the Z-direction. The cathode 18 may be formed via EPD of the cathode material 19 on the top surface of the electrolyte 20. By forming the cathode 18 via EPD, the cathode 18 can desirably be formed to have a small thickness.

The cathode material 19 can be any suitable cathode material for a SOFC. The cathode material 19 is a porous low temperature material that sinters at a temperature of 850° C. or less. For example, the cathode material 19 may be SSC having the formula $SrSmCoO_3$, $PrBaSrCoFeO$, or any suitable perovskite oxide having the general formula $ABO_3$. The cathode material 19 has a porosity of 30-60%.

The electrolyte 20 includes a solid oxide ceramic material 22. The electrolyte 20 has a thickness of approximately 5-15 μm in the Z-direction. For example, the electrolyte 20 has a thickness of 10 μm or less. The electrolyte 20 may be formed via EPD of the solid oxide ceramic material 22 on the top surface of the anode 24. By forming the electrolyte 20 via EPD, the electrolyte 20 can desirably be formed to have a small thickness.

The solid oxide ceramic material 22 can be any suitable solid oxide ceramic material, for example ScCeSZ. The solid oxide ceramic material 22 is dense and preferably has a porosity of 1% or less. By providing a solid oxide ceramic material 22 that is dense, the electrolyte 20 may be stacked more easily without using adhesives, thereby eliminating the undesirable sealing issues with conventional metal-supported SOFCs.

The anode 24 is formed of a porous anode material 26 having a plurality of pores 28 formed therein. The anode 24 is preferably formed via EPD of the porous anode material 26 on the metal substrate 30 in the Z-direction. The anode 24 has a thickness of approximately 2.5-15 μm, preferably 7-15 μm in the Z-direction.

As shown in FIG. 1, the porous anode material 26 is formed on the top surface of the metal substrate 30 and within holes 33 in the metal substrate 30. The porous anode material 26 has a porosity of approximately 30-50%. The porous anode material 26 includes a metal oxide and a solid oxide ceramic material. The solid oxide ceramic material included in the porous anode material 26 preferably has the same composition as the solid oxide ceramic material 22.

For example, the metal oxide may be NiO, and the solid oxide ceramic material may be ScCeSZ. The porous anode material 26 includes approximately 40-60% by volume of NiO and approximately 40-60% by volume of ScCeSZ. The porous anode material 26 preferably includes 50% by volume of NiO and 50% by volume of ScCeSZ. However, the porous anode material 26 may optionally include additives such as tin (Sn). It should be understood that the ScCeSZ material also includes gadolinium (Gd) as a dopant for the ceria (CeO) in the ScCeSZ material. The pores 28 have a size or diameter of approximately 1-5 μm.

The metal substrate 30 is formed of a metal 32 and has a plurality of holes 33 formed therein. The metal 32 is preferably any suitable metal for use in a metal-supported SOFC. For example, the metal may be stainless steel such as SS type 440. The metal 32 has a porosity of approximately 30-50%. The metal 32 has a thickness of approximately 250-600 μm, preferably no greater than 350 μm. For example, the metal 32 has a thickness of 300 μm in the Z-direction and a width of 30 mm in the X-direction.

The plurality of holes 33 each has a different size at one surface of the metal substrate 30 than at the opposite surface of the metal substrate 30 as shown in FIG. 1. For example, the plurality of holes 33 each has a diameter of approximately 40-60 μm at the bottom surface of the metal substrate 30 and a diameter of approximately 5-20 μm at the top surface of the metal substrate 30 that is in contact with the anode 24.

The plurality of holes 33 in the metal substrate 30 may be formed by laser drilling holes in the metal 32. The holes 33 are not formed at the edge of the metal substrate 30 and instead are formed at a distance of 2-5 mm from the edges of the metal substrate 30 in the X-direction as shown in FIG. 1. Preferably, the holes 33 do not make up more than 30-50% of the surface area of the metal substrate 30. As shown in FIG. 1, the holes 33 each have a V-shape in which the diameter of the hole is different at one surface of the metal substrate 30 than at the opposite surface. However, it should be understood that the holes 33 may have any suitable shape. For example, the holes 33 may have a same diameter of approximately 5-60 μm throughout the metal substrate 30 such that the diameter of the holes 33 is the same at opposite surfaces of the metal substrate 30. Furthermore, although the holes 33 in FIG. 1 each have a uniform shape and size, it should be understood that the plurality of holes 33 in the metal substrate 30 may have varying shapes and sizes. Preferably, the diameter of the holes 33 is greater at the bottom surface of the metal substrate 30 than at the top surface of the metal substrate 30 that is closer to the electrolyte 20 than the bottom surface.

The solid oxide fuel cell stack 1 includes a metal mesh 34 provided between the metal substrate 30 and a negative electrode terminal 36. The metal mesh 34 is in contact with both the metal substrate 30 of the first fuel cell and the negative electrode terminal 36. The metal mesh 34 is formed of a suitable metal for making electrical contact between the metal substrate 30 and the negative electrode terminal 36. For example, the metal mesh 34 is preferably formed of nickel or copper. The metal mesh 34 has a grid-like pattern with square- or rectangular-shaped holes between portions of the metal. The metal mesh 34 has a thickness in the Z-direction of approximately 30-50 μm. The metal mesh 34 has a length in the Y-direction and a width in the X-direction that are less than the length and width of the metal substrate 30, respectively.

The solid oxide fuel cell stack 1 also includes the negative electrode terminal 36. As shown in FIG. 1, the negative electrode terminal 36 is in contact with both the metal mesh 34 and a metal mesh 38. The negative electrode terminal 36 is formed of any suitable metal, such as copper or a stainless steel material, for example Crofer. The negative electrode terminal 36 has a frame-like shape with a rectangular-shaped hole formed in the center thereof to allow fuel to flow from semi-circular channels 46 on the top surface of a metal plate 42 to the holes 33 in the metal substrate 30 of the first fuel cell. The negative electrode terminal 36 has a lead that protrudes from the cell stack with a width in the X-direction of approximately 1 cm to 2 cm. The negative electrode terminal 36 has a length in the Y-direction of approximately 3 cm to 15 cm and a thickness in the Z-direction of approximately 0.01 cm to 0.3 cm. It should be understood that the negative electrode terminal 36 has any suitable shape and dimensions such that fuel can flow from the semi-circular channels 46 on the top surface of the metal plate 42 to the holes 33 in the metal substrate 30.

The metal mesh 38 of the solid oxide fuel cell stack 1 is provided between the negative electrode terminal 36 and a fuel flow bipolar plate 40. The metal mesh 38 is in contact with both the negative electrode terminal 36 and the bipolar plate 40. The metal mesh 38 is formed of a suitable metal for making electrical contact between the negative electrode terminal 36 and the bipolar plate 40. For example, the metal mesh 38 is preferably formed of nickel or copper. The metal mesh 38 has a grid-like pattern with square- or rectangular-shaped holes between portions of the metal. The metal mesh 38 has a thickness in the Z-direction of approximately 30-50 μm. The metal mesh 38 has a length in the Y-direction and a width in the X-direction that are less than the length and width of the metal substrate 30, respectively.

The bipolar plate 40 includes a metal plate 42, a first coating 44, a plurality of semi-circular channels 46 formed on the top and bottom surfaces of the metal plate 42, and a second coating 48. The metal plate 42 can be any suitable metal for a bipolar plate. For example, the metal plate can be formed of a stainless steel material, such as SS 330, SS 441 or Crofer 22, preferably SS 441. A total width of the bipolar plate 40 in the X-direction, including the first coating 44 and the second coating 48, ranges from 10 cm to 50 cm, and is preferably 20 cm. The thickness of the bipolar plate 40 in the Z-direction ranges from 500 μm to 800 μm, and a length of the bipolar plate 40 in the Y-direction ranges from 10 cm to 50 cm, preferably 40 cm.

The metal plate 42 is covered by a first coating 44. The first coating 44 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 1. For example, the first coating 44 can include at least one Cu—Mn based spinel, such as $CuNi_{0.2}Mn_{1.8}O_4$, or at least one Mn—Co based spinel, such as $MnCo_2O_4$.

As shown in FIG. 1, the first coating 44 covers a part of the top surface of the metal plate 42, a part of the bottom surface of the metal plate 42 including the semi-circular channels 46, and both edges or side surfaces of the metal plate 42. The first coating 44 is dense and has a thickness of approximately 1 μm to 10 μm. However, it should be understood that the first coating 44 can cover the entire metal plate 42 or can cover only the semi-circular channels 46, as long as the first coating 44 covers at least the entirety of the semi-circular channels 46.

The first coating 44 can alternatively be a bi-layer coating including a bottom layer closer to the surface of the metal plate 42 that includes the non-metal oxide coating, and a top or outer layer that includes a reforming catalyst. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 μm to 50 μm, and the non-metal oxide layer has a thickness of approximately 1 μm to 10 μm. By providing the reforming catalyst layer on the metal plate 42, the compatibility of the solid oxide fuel cell stack 1 with various types of fuels can be improved. For example, by changing the reforming catalyst, the types of fuels used with the solid oxide fuel cell stack 1 can also advantageously be changed.

The semi-circular channels 46 are formed as cavities in both the top and bottom surfaces of the metal plate 42. The semi-circular channels 46 have a rounded shape with no defined edge as shown in FIG. 1. The semi-circular channels 46 each have a width or diameter of approximately 10 μm to 500 μm, preferably 100 μm to 250 μm, in the X-direction. The semi-circular channels 46 each have a height of approximately 10 μm to 500 μm, preferably 100 μm to 250 μm, in the Z-direction. The semi-circular channels 46 are spaced apart on the top and bottom surfaces of the metal plate 42 at regular intervals of approximately 10 μm to 500 μm, preferably 100 μm to 250 μm, between each of the semi-circular channels 46. However, it should be understood that the semi-circular channels 46 can include only one channel or can be formed at irregular intervals along the top and bottom surfaces of the metal plate 42. As shown in FIG. 1, fuel flows along the semi-circular channels 46 in the Y-direction.

The second coating 48 is an insulating material that seals the metal plate 42. The second coating 48 preferably includes a YSZ ceramic. The second coating 48 can also contain glass to prevent fusion at low temperatures of less than 700° C. Any suitable insulating material may be used as the second coating 48, as long as the insulating material can be coated on the metal plate 42 at a temperature of less than 700° C. For example, the second coating 48 can include at least one of: silicate glass, a silicate/glass-ceramic, a Ba—Al—B—La silicate/glass-ceramic, and a Sr—Ca—B—Zn—Ti silicate glass-ceramic. The second coating 48 has a thickness of approximately 10 μm to 20 μm.

The solid oxide fuel cell stack 1 includes a metal mesh 49 provided between the bipolar plate 40 and a negative electrode terminal 50. The metal mesh 49 is in contact with both the bipolar plate 40 and the negative electrode terminal 50. The metal mesh 49 is formed of a suitable metal for making electrical contact between the bipolar plate 40 and the negative electrode terminal 50. For example, the metal mesh 49 is preferably formed of nickel or copper. The metal mesh 49 has a grid-like pattern with square- or rectangular-shaped holes between portions of the metal. The metal mesh 49 has a thickness in the Z-direction of approximately 30-50 μm. The metal mesh 49 has a length in the Y-direction and a width in the X-direction that are less than the length and width of the bipolar plate 40, respectively, and the mesh 49 fits within the portions of the second coating 48 and the first coating 44 provided on the top surface of the bipolar plate 40.

The solid oxide fuel cell stack 1 also includes the negative electrode terminal 50 and a metal mesh 52. As shown in FIG. 1, the negative electrode terminal 50 is in contact with both the metal mesh 49 and the metal mesh 52. The negative electrode terminal 50 is formed of any suitable metal, such as copper or a stainless steel material, for example Crofer. The negative electrode terminal 50 has a frame-like shape with a rectangular-shaped hole formed in the center thereof to allow fuel to flow from the semi-circular channels 46 on the bottom surface of the metal plate 42 to holes 57 in the metal substrate 54 of the second fuel cell. The negative electrode terminal 50 has a lead that protrudes from the cell stack with a width in the X-direction of approximately 1 cm to 2 cm. The negative electrode terminal 50 has a length in the Y-direction of approximately 3 cm to 15 cm and a thickness in the Z-direction of approximately 0.01 cm to 0.3 cm. It should be understood that the negative electrode terminal 50 has any suitable shape and dimensions such that fuel can flow from the semi-circular channels 46 on the bottom surface of the metal plate 42 to the holes 57 in the metal substrate 54.

The metal mesh 52 is provided between the negative electrode terminal 50 and a metal substrate 54 of a second fuel cell. The second fuel cell includes the metal substrate 54, an anode 62, an electrolyte 64, and a cathode 68.

The metal mesh 52 is in contact with both the negative electrode terminal 50 and the metal substrate 54. The metal mesh 52 is formed of a suitable metal for making electrical contact between the negative electrode terminal 50 and the metal substrate 54. For example, the metal mesh 52 is preferably formed of nickel or copper. The metal mesh 52 has a grid-like pattern with square- or rectangular-shaped holes between portions of the metal. The metal mesh 52 has a thickness in the Z-direction of approximately 30-50 μm. The metal mesh 52 has a length in the Y-direction and a width in the X-direction that are less than the length and width of the metal substrate 54, respectively.

As with the metal substrate 30 of the first fuel cell, the metal substrate 54 of the second fuel cell is formed of a metal 56 and has a plurality of holes 57 formed therein. A porous anode material 58 having a plurality of pores 60 is formed on the bottom surface of the metal substrate 54 and within holes 57 in the metal substrate 54.

The metal 56 is preferably any suitable metal for use in a metal-supported SOFC. For example, the metal may be stainless steel such as SS type 440. The metal 56 has a porosity of approximately 30-50%. The metal 56 has a thickness of approximately 250-600 μm, preferably no greater than 350 μm. For example, the metal 56 has a thickness of 300 μm in the Z-direction and a width of 30 mm in the X-direction.

The plurality of holes 57 each has a different size at one surface of the metal substrate 54 than at the opposite surface of the metal substrate 54. For example, the plurality of holes 57 each has a diameter of approximately 40-60 μm at the top surface of the metal substrate 54 and a diameter of approximately 5-20 μm at the bottom surface of the metal substrate 54 that is in contact with the anode 62.

The plurality of holes 57 in the metal substrate 54 may be formed by laser drilling holes in the metal 56. The holes 57 are not formed at the edge of the metal substrate 54 and instead are formed at a distance of 2-5 mm from the edges of the metal substrate 54 in the X-direction as shown in FIG. 1. Preferably, the holes 57 do not make up more than 30-50% of the surface area of the metal substrate 54. The holes 57 each have a V-shape in which the diameter of the hole is different at one surface of the metal substrate 54 than at the opposite surface. However, it should be understood that the holes 57 may have any suitable shape. For example, the holes 57 may have a same diameter of approximately 5-60 μm throughout the metal substrate 54 such that the diameter of the holes 57 is the same at opposite surfaces of the metal substrate 54. Furthermore, although the holes 57 in FIG. 1 each have a uniform shape and size, it should be understood that the plurality of holes 57 in the metal substrate 54 may have varying shapes and sizes. Preferably, the diameter of the holes 57 is greater at the top surface of the metal substrate 54 than at the bottom surface of the metal substrate 54 that is closer to the electrolyte 64 than the bottom surface.

The porous anode material 58 has a porosity of approximately 30-50%. The porous anode material 58 includes a metal oxide and a solid oxide ceramic material. For example, the metal oxide may be NiO, and the solid oxide ceramic material may be ScCeSZ. The porous anode material 58 includes approximately 40-60% by volume of NiO and approximately 40-60% by volume of ScCeSZ. The porous anode material 58 preferably includes 50% by volume of NiO and 50% by volume of ScCeSZ. However, the porous anode material 58 may optionally include additives such as tin. It should be understood that the ScCeSZ material also includes Gd as a dopant for the CeO in the ScCeSZ material. The pores 60 have a size or diameter of approximately 1-5 µm.

The anode 62 of the second fuel cell is formed of the porous anode material 58 having a plurality of pores 60 formed therein. The anode 62 is preferably formed via EPD of the porous anode material 58 on the metal substrate 54 in the Z-direction. The anode 62 has a thickness of approximately 2.5-15 µm, preferably 7-15 µm in the Z-direction.

The electrolyte 64 is a solid oxide electrolyte that includes a solid oxide ceramic material 66. The electrolyte 64 has a thickness of approximately 5-15 µm in the Z-direction. For example, the electrolyte 64 has a thickness of 10 µm or less. The electrolyte 64 may be formed via EPD of the solid oxide ceramic material 66 on the surface of the anode 62. By forming the electrolyte 64 via EPD, the electrolyte 64 can desirably be formed to have a small thickness.

The solid oxide ceramic material 66 can be any suitable solid oxide ceramic material. For example, the solid oxide ceramic material 66 can be dense and preferably has a porosity of 1% or less. By providing a solid oxide ceramic material 66 that is dense, the electrolyte 64 may be stacked more easily without using adhesives, thereby eliminating the undesirable sealing issues with conventional metal-supported SOFCs. For example, the solid oxide ceramic material 66 may be ScCeSZ. The solid oxide ceramic material 66 preferably has the same composition as the solid oxide material included in the anode material 58.

The cathode 68 includes a cathode material 70. The cathode 68 has a thickness of 20-30 µm in the Z-direction. The cathode 68 may be formed via EPD of the cathode material 70 on the surface of the electrolyte 64. As with the electrolyte 64, by forming the cathode 68 via EPD, the cathode 68 can desirably be formed to have a small thickness.

The cathode material 70 can be any suitable cathode material for a SOFC. The cathode material 70 is a porous low temperature material that sinters at a temperature of 850° C. or less. For example, the cathode material 70 may be SSC having the formula $SrSmCoO_3$, $PrBaSrCoFeO$, or any suitable perovskite oxide having the general formula $ABO_3$. The cathode material 70 has a porosity of 30-60%.

The solid oxide fuel cell stack 1 includes a mesh current collector 72 in contact with both the cathode 68 of the second fuel cell and a positive electrode terminal 73. The mesh current collector 72 is formed of a suitable metal for making electrical contact between the cathode 68 and the positive electrode terminal 73. For example, the mesh current collector 72 is preferably formed of nickel or copper. The mesh current collector 72 has a grid-like pattern with square- or rectangular-shaped holes between portions of the metal. The mesh current collector 72 has a thickness in the Z-direction of approximately 30-50 µm. The mesh current collector 72 has a length in the Y-direction and a width in the X-direction that are less than the length and width of a positive electrode terminal 73, respectively.

The solid oxide fuel cell stack 1 also includes a positive electrode terminal 73. As shown in FIG. 1, the positive electrode terminal 73 is in contact with a bottom plate 80. The positive electrode terminal 73 is formed of any suitable metal. For example, the positive electrode terminal 73 can be formed of copper or a stainless steel material such as Crofer. The positive electrode terminal 73 has a frame-like shape with a rectangular-shaped hole formed in the center thereof to allow air to flow from semi-circular channels 80 on the top surface of a metal plate 76 to the cathode 68 of the second fuel cell. The positive electrode terminal 73 has a lead that protrudes from the cell stack with a width in the X-direction of approximately 1 cm to 2 cm. The positive electrode terminal 73 also has a length in the Y-direction of approximately 3 cm to 15 cm and a thickness in the Z-direction of approximately 0.01 cm to 0.3 cm. It should be understood that the positive electrode terminal 73 has any suitable shape and dimensions such that air can flow from the semi-circular channels 80 to the cathode 68.

The fuel cell stack 1 also includes a bipolar plate 74. The bipolar plate 74 includes a metal plate 76, a first coating 77, a second coating 78, and the plurality of semi-circular channels 80 formed on the top surface of the metal plate 76. Although not shown in the cross-sectional view, the plurality of semi-circular channels 80 extend along the bottom surface of the metal plate 76 in the X-direction such that air flows in the X-direction along the semi-circular channels 78. However, as shown in FIG. 1, the semi-circular channels 80 do not extend along the entire width of the metal plate 76 in the X-direction. The metal plate 76 can be any suitable metal for a bipolar plate. For example, the metal plate can be formed of a stainless steel material, such as SS 330, SS 441 or Crofer 22, preferably SS 441. A total width of the bipolar plate 74 in the X-direction, including the first coating 77 and the second coating 78, ranges from 10 cm to 50 cm, and is preferably 20 cm. The thickness of the bipolar plate 74 in the Z-direction ranges from 500 µm to 800 µm, and a length of the bipolar plate 74 in the Y-direction ranges from 10 cm to 50 cm, preferably 40 cm.

The metal plate 76 is covered by a first coating 77. The first coating 77 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 100. For example, the first coating 77 can include at least one Cu—Mn based spinel, such as $CuNi_{0.2}Mn_{1.8}O_4$, or at least one Mn—Co based spinel, such as $MnCo_2O_4$.

As shown in FIG. 1, the first coating 77 covers a part of the bottom surface of the metal plate 76, a part of the top surface of the metal plate 76 including the semi-circular channels 80, and both edges or side surfaces of the metal plate 76. The first coating 77 is dense and has a thickness of approximately 1 µm to 10 µm. However, it should be understood that the first coating 77 can cover the entire metal plate 76 or can cover only the semi-circular channels 80, as long as the first coating 77 covers at least the entirety of the semi-circular channels 80.

Alternatively, the first coating 77 can be a bi-layer coating including a bottom layer closer to the surface of the metal plate 76 that includes the non-metal oxide coating, and a top or outer layer that includes a reforming catalyst. The reforming catalyst includes a high entropy alloy or a mixture of high entropy alloys. For example, the reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 μm to 50 μm, and the non-metal oxide layer has a thickness of approximately 1 μm to 10 μm. By providing the reforming catalyst layer on the metal plate 76, the compatibility of the solid oxide fuel cell stack 1 with various types of fuels can be improved. For example, by changing the reforming catalyst, the types of fuels used with the solid oxide fuel cell stack 1 can also advantageously be changed.

The semi-circular channels 80 are formed as cavities in the top surface of the metal plate 76. The semi-circular channels 80 each have a width or diameter of approximately 10 μm to 500 μm, preferably 100 μm to 250 μm, in the Y-direction. The semi-circular channels 80 each have a height of approximately 10 μm to 500 μm, preferably 100 μm to 250 μm, in the Z-direction.

The semi-circular channels 80 are spaced apart on the top surface of the metal plate 76 at regular intervals of approximately 10 μm to 500 μm, preferably 100 μm to 250 μm, between each of the semi-circular channels 80 in the Y-direction. However, it should be understood that the semi-circular channels 80 can include only one channel or can be formed at irregular intervals along the bottom surface of the metal plate 76 in the Y-direction. As shown in FIG. 1, air flows along the semi-circular channels 80 in the X-direction.

The second coating 78 is an insulating material that seals the metal plate 76. The second coating 78 preferably includes a YSZ ceramic. The second coating 78 can also contain glass to prevent fusion at low temperatures of less than 700° C. Any suitable insulating material may be used as the second coating 78, as long as the insulating material can be coated on the metal plate 76 at a temperature of less than 700° C. For example, the second coating 78 can include at least one of: silicate glass, a silicate/glass-ceramic, a Ba—Al—B—La silicate/glass-ceramic, and a Sr—Ca—B—Zn—Ti silicate glass-ceramic. The second coating 78 has a thickness of approximately 10 μm to 20 μm.

The bottom end plate 82 of the fuel cell stack 1 acts as a current collector. The bottom end plate 82 is a metal plate formed of, for example, stainless steel, preferably a SS 440 series metal. The bottom end plate 82 has a width in the X-direction that is greater than the width of the bipolar plate 74. For example, the width of the bottom end plate 82 in the X-direction ranges from 10 cm to 30 cm. The bottom end plate 82 has a length in the Y-direction of 10 cm to 60 cm and a thickness in the Z-direction ranging from 0.3 cm to 1 cm.

The bottom end plate 82 is coated with a sealant. The sealant is an insulating material for sealing the fuel cell stack 1 and preferably includes a YSZ ceramic material. The sealant can also contain glass to prevent fusion at low temperatures of less than 700° C. The sealant may be the same material as the second coating 12, the second coating 48 or the second coating 78 and is any suitable insulating material.

However, it should be understood that any suitable insulating material may be used as the sealant, as long as the insulating material can be coated on the metal bottom end plate 82 at a temperature of less than 700° C. For example, the sealant can include at least one of: silicate glass, a silicate/glass-ceramic, a Ba—Al—B—La silicate/glass-ceramic, and a Sr—Ca—B—Zn—Ti silicate glass-ceramic. The sealant has a thickness of approximately 10 μm to 20 μm.

Figure 2:
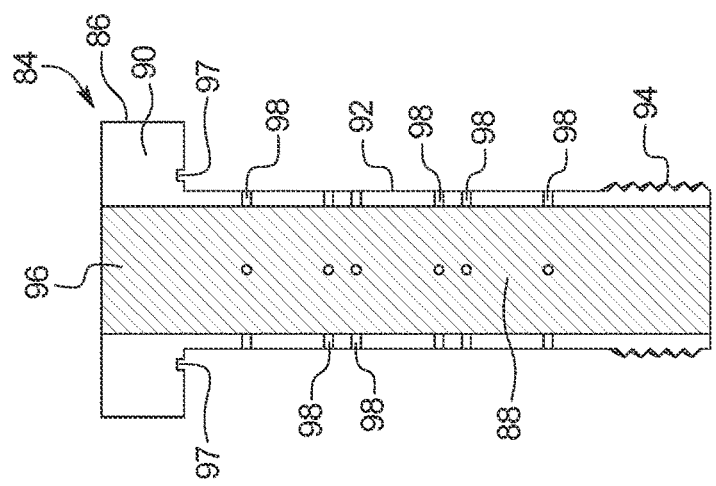
FIG. 2 is a cross-sectional view of one of the hollow fasteners of FIG. 1.

The fuel cell stack also includes hollow screws 84. As shown in FIG. 2, each of the hollow screws 84 is formed of a hollow metal screw 86 having a hole 88 formed down a center axis of the screw 86. The metal screw 86 is formed of any suitable metal material for use as a fastener in a SOFC stack. For example, the metal screw 86 may be formed of a stainless steel material and is preferably formed of a SS 440 material. The metal screw 86 has a length ranging from 10 cm to 24 cm. The hole 88 forms a gas flow channel in the interior of the hollow metal screw 86 along the entire length of the screw 86. The hole 88 has a diameter of approximately 500 μm to 10 mm, preferably 1 mm to 5 mm.

The metal screw 86 also includes a head 90 and a lower body 92. The head 90 has a diameter of 1.2 cm, and the lower body 92 has a diameter of approximately 0.8 cm. However, it should be understood that any suitable diameters may be used for the head 90 and the lower body 92, as long as the head 90 has a larger diameter than the lower body 92 and the diameters do not adversely affect the mechanical strength of the fuel cell stack 1. The hole 88 in the metal screw is formed in a top surface of the head 90 so that the hole 88 extends through the entire length of the screw 86. The lower body 92 includes threaded portions 94.

The metal screw 86 is coated with an insulating material 96. The insulating material 96 may be the same material as the second coating 12, the second coating 48, or the second coating 78 and is any suitable insulating material. For example, the insulating material 96 can include at least one of: silicate glass, a silicate/glass-ceramic, a Ba—Al—B—La silicate/glass-ceramic, and a Sr—Ca—B—Zn—Ti silicate glass-ceramic. The insulating material 96 has a thickness of 20-50 μm. As shown in FIG. 2, the insulating material 96 is formed on the exterior surface of the screw 86 and within the hole 88 down the center axis of the screw 86 such that insulating material 96 covers not only the exterior surface of the screw 96 but also the surface of the interior gas distribution channel.

The metal screw 86 also includes grooves 97 formed in the lower surface of the head 90 that form a sealing seat, and a plurality of holes 98 formed in the lower body 92. As shown in FIG. 2, the grooves 97 do not extend all the way through the head 90 and instead have a height and a width that are each approximately 0.1-5 mm. The holes 98 each extend from an exterior surface of the lower body 92 to the hole 88 formed down the center axis of the screw 86. The holes 98 each have a diameter of approximately 500 μm to 10 mm, preferably 1 mm to 3 mm. The insulating material 96 is formed within the interior of holes 98 such that the insulating material 96 covers the surface of holes 98.

Although FIG. 1 shows a configuration in which two air side bipolar plates 8 and 74 are each provided at opposite ends of the cell stack for air to flow to a cathode of a fuel cell, and a single bipolar plate 40 is provided in the center of the cell stack for fuel to flow to anodes that face each other, it should be understood that the fuel cell stack 1 may be configured to flip the first and second fuel cells such that the anodes are closest to the end plates. In such a configuration, the positive electrode terminals 15 and 73 would be replaced with negative electrode terminals, the air side bipolar plates 8 and 74 would be replaced with fuel side bipolar plates that each allow fuel to flow to an anode of a fuel cell, and bipolar plate 40 would be replaced with an air side bipolar plate that allows air to flow to cathodes that face each other.

It should also be understood that any suitable cathode gas may be used instead of air. Furthermore, it should be understood that, although the semi-circular channels 14 and 78 extend along the X-direction and the semi-circular channels 46 extend along the Y-direction, the semi-circular channels 14 and 78 can be configured to extend along the Y-direction and the semi-circular channels 46 can be configured to extend along the X-direction, as long as the semi-circular channels 14 and 78 extend in the same direction and such direction is transverse to the direction in which the semi-circular channels 46 extend.

Figure 3:
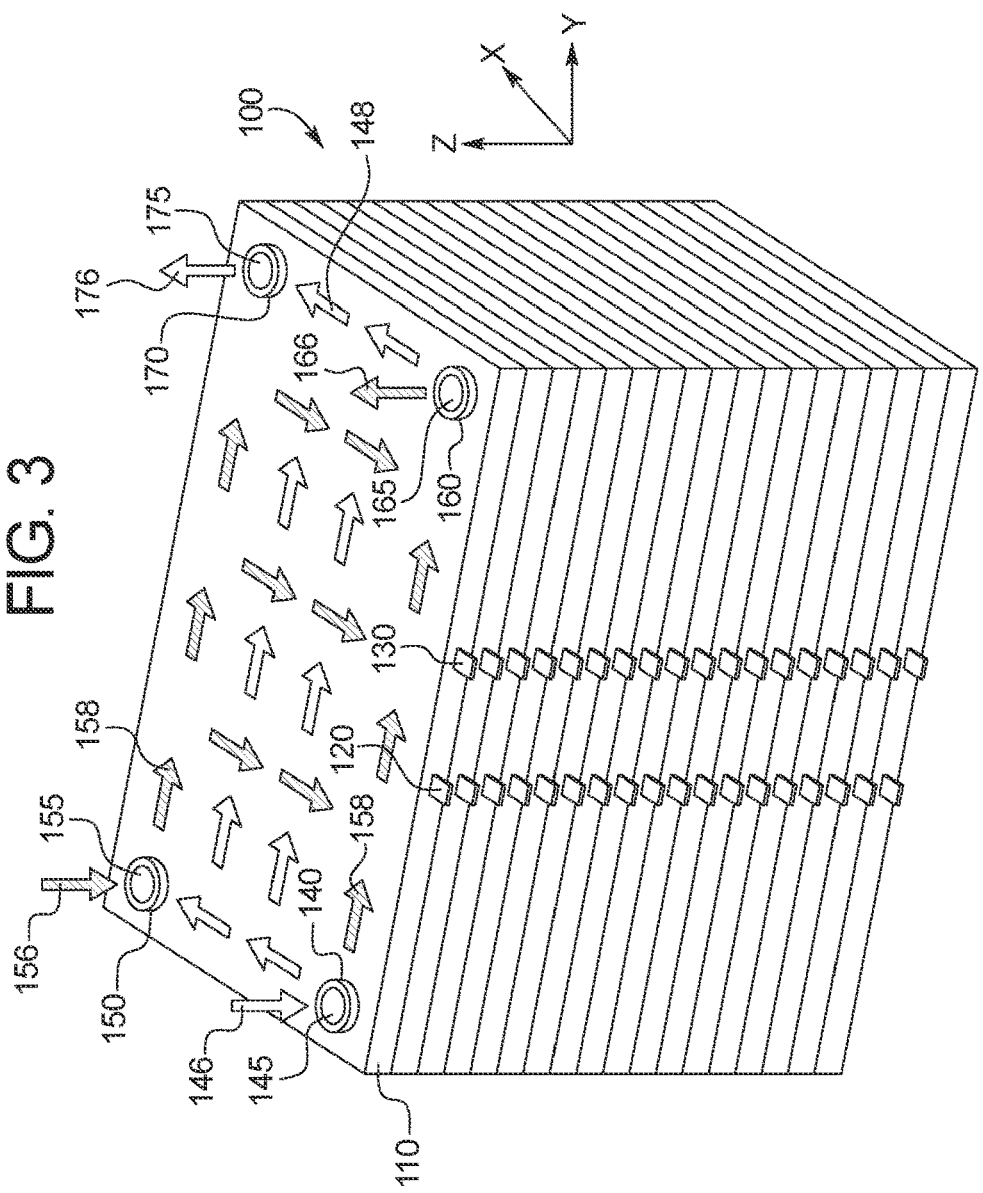
FIG. 3 is a perspective view of a fuel cell stack according to an embodiment.

FIG. 3 shows a fuel cell stack 100 in accordance with a second embodiment. The fuel cell stack includes a plurality of fuel cells 110 that each include a positive electrode terminal 120 and a negative electrode terminal 130 with leads that protrude to the exterior of the cell stack 100. A total thickness of the fuel cell stack 100 is 2 mm to 3 mm, preferably 2 mm.

The positive electrode terminal 120 and the negative electrode terminal 130 are formed of any suitable metal. For example, the positive electrode terminal 120 and the negative electrode terminal 130 can each be formed of copper or a stainless steel material such as Crofer. The positive electrode terminal 120 and the negative electrode terminal 130 each have a frame-like shape with a rectangular-shaped hole formed in the center thereof to allow gas to flow therethrough. The positive electrode terminal 120 and the negative electrode terminal 130 each have a length of approximately 3 cm to 15 cm and a thickness of approximately 0.01 cm to 0.3 cm. Furthermore, the leads of the positive electrode terminal 120 and the negative electrode each protrude from the cell stack 100 with a width of approximately 1 cm to 2 cm.

As shown in FIG. 3, the fuel cell stack 100 is frameless because it is secured by hollow screws 140, 150, 160 and 170. As shown in FIG. 3, the hollow screw 140 includes a hole 145 formed down a center axis thereof to allow for entrance of a fuel into the cell stack 100. Arrows 146 show the flow of fuel into the fuel cell stack 100, and arrows 148 show the flow of fuel throughout the cells in the fuel cell stack 100. The hollow screw 150 includes a hole 155 formed down a center axis thereof to allow for entrance of air into the cell stack 100. Arrows 156 show the flow of air into the fuel cell stack 100, and arrows 158 show the flow of air throughout the cells in the fuel cell stack 100. The holes 145 and 155 each have a diameter of approximately 500 µm to 10 mm, preferably 1 mm to 5 mm.

The hollow screw 160 includes a hole 165 formed down a center axis thereof to allow air to exit the cell stack 100. Arrow 166 shows the air exiting the fuel cell stack 100. The hollow screw 170 includes a hole 175 formed down a center axis thereof to allow fuel to exit the cell stack 100. Arrow 176 shows the fuel exiting the fuel cell stack 100. The holes 165 and 175 each have a diameter of approximately 500 µm to 10 mm, preferably 1 mm to 5 mm.

Figure 4:
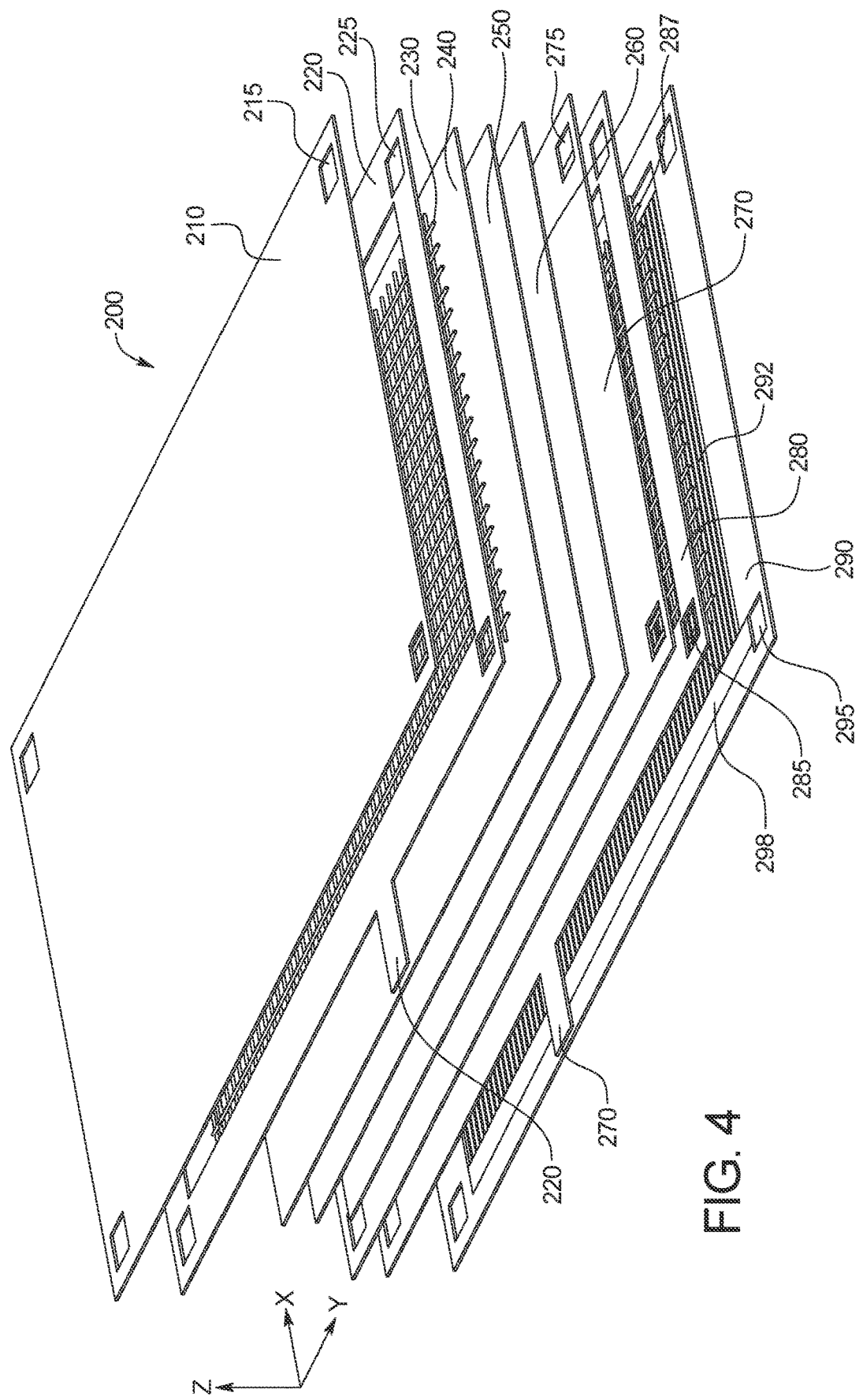
FIG. 4 is a perspective view of a single fuel cell in a fuel cell stack according to an embodiment.

As shown in FIG. 4, a single fuel cell 200 in a fuel cell stack according to an embodiment includes a top bipolar plate 210 having holes 215 formed in each corner of the top bipolar plate 210. The top bipolar plate 210 can be formed of any suitable metal for a bipolar plate. Although not shown in FIG. 4, the top bipolar plate 210 includes semi-circular channels that extend in the Y-direction to allow air flow to the fuel cell 200. For example, the bipolar plate 210 can be formed of a stainless steel material, such as SS 330, SS 441 or Crofer 22, preferably SS 441. A total width of the top bipolar plate 210 in the X-direction ranges from 10 cm to 50 cm, and is preferably 20 cm. The thickness of the top bipolar plate 210 in the Z-direction ranges from 500 µm to 800 µm, and a length of the top bipolar plate 210 in the Y-direction is between 10 cm and 50 cm, preferably 40 cm.

The fuel cell 200 also includes a positive electrode terminal 220 having holes 225 formed in each corner of the positive electrode terminal 220. The positive electrode terminal 220 is formed of any suitable metal. For example, the positive electrode terminal 220 can be formed of copper or a stainless steel material such as Crofer. The positive electrode terminal 220 has a frame-like shape with a rectangular-shaped hole formed in the center thereof to allow air to flow from the semi-circular channels in the top bipolar plate 210 to a cathode 240 of the fuel cell 200. The positive electrode terminal 220 includes a lead that protrudes from the fuel cell 200 with a width in the X-direction of approximately 1 cm to 2 cm. The positive electrode terminal 220 also has a length in the Y-direction of approximately 3 cm to 15 cm and a thickness in the Z-direction of approximately 0.01 cm to 0.3 cm. It should be understood that the positive electrode terminal 220 has any suitable shape and dimensions such that air can flow from the semi-circular channels of the top bipolar plate 210 to the cathode 240.

The fuel cell 200 includes a mesh current collector 230 between the positive electrode terminal 220 and the cathode 240. The mesh current collector 230 is formed of a suitable metal for making electrical contact between the positive electrode terminal 220 and the cathode 240. For example, the mesh current collector 230 is preferably formed of nickel or copper. The mesh current collector 230 has a grid-like pattern with square- or rectangular-shaped holes between portions of the metal. The mesh current collector 230 has a thickness in the Z-direction of approximately 30-50 µm. The mesh current collector 230 has a length in the Y-direction and a width in the X-direction that are less than the length and width of the positive electrode terminal 220, respectively. The mesh current collector 230 is dimensioned in the X- and Y-directions so as to fit inside the frame of the positive electrode terminal 220.

The cathode 240 has a thickness of 20-30 µm in the Z-direction. The cathode 240 can be formed of any suitable cathode material for a SOFC. In particular, the cathode 240 is formed of a porous low temperature material that sinters at a temperature of 850° C. or less, such as SSC having the formula $SrSmCoO_3$, $PrBaSrCoFeO$, or any suitable perovskite oxide having the general formula $ABO_3$. The cathode 240 has a porosity of 30-60%.

The fuel cell 200 also includes an electrolyte 250 formed of a solid oxide ceramic material. The electrolyte 250 has a thickness of approximately 5-15 µm in the Z-direction. For example, the electrolyte 250 has a thickness of 10 µm or less. The solid oxide ceramic material of the electrolyte 250 can be any suitable solid oxide ceramic material, for example ScCeSZ. The electrolyte 250 is dense and preferably has a porosity of 1% or less, thus enabling the electrolyte 250 to be stacked more easily without using adhesives, thereby eliminating the undesirable sealing issues with conventional metal-supported SOFCs.

The fuel cell 200 includes an anode 260. The anode 260 is formed of a porous anode material having a plurality of pores formed therein. The anode 260 has a thickness of approximately 2.5-15 µm, preferably 7-15 µm in the Z-direction. The anode 260 has a porosity of approximately 30-50%. The anode 260 is preferably formed of a metal oxide and a solid oxide ceramic material. The solid oxide ceramic material included in the anode 260 preferably has the same composition as the solid oxide ceramic material of the electrolyte 250.

For example, the metal oxide may be NiO, and the solid oxide ceramic material may be ScCeSZ. The porous anode material includes approximately 40-60% by volume of NiO and approximately 40-60% by volume of ScCeSZ, preferably 50% by volume of NiO and 50% by volume of ScCeSZ. However, the anode 260 may optionally include additives such as tin (Sn). It should be understood that the ScCeSZ material also includes gadolinium (Gd) as a dopant for the ceria (CeO) in the ScCeSZ material. The pores in the porous anode material have a size or diameter of approximately 1-5 µm.

The fuel cell 200 also includes a metal substrate 270 that supports the anode 260. The metal substrate 270 has holes 275 formed in each corner of the metal substrate 270. The metal substrate 270 is formed of a suitable metal for use in a metal-supported SOFC. For example, the metal may be stainless steel such as SS type 440. The metal has a porosity of approximately 30-50%. The metal substrate 270 has a thickness of approximately 250-600 µm, preferably no greater than 350 µm. For example, the metal substrate 270 has a thickness of 300 µm in the Z-direction and a width of 30 mm in the X-direction.

The fuel cell 200 further includes a negative electrode terminal 280 having holes 285 formed in each corner of the negative electrode terminal 280. The negative electrode terminal 280 is formed of any suitable metal. For example, the positive electrode terminal 280 can be formed of copper or a stainless steel material such as Crofer. The negative electrode terminal 280 has a frame-like shape with a rectangular-shaped hole formed in the center thereof to allow fuel to flow from the metal substrate 270 of the fuel cell 200 to semi-circular channels 292 in a bottom bipolar plate 290. The negative electrode terminal 280 includes a lead that protrudes from the fuel cell 200 with a width in the X-direction of approximately 1 cm to 2 cm. The negative electrode terminal 280 also has a length in the Y-direction of approximately 3 cm to 15 cm and a thickness in the Z-direction of approximately 0.01 cm to 0.3 cm. It should be understood that the negative electrode terminal 280 has any suitable shape and dimensions such that fuel can flow from the metal substrate 270 to semi-circular channels 292 of the bottom bipolar plate 290.

A mesh current collector 287 is disposed between the negative electrode terminal 280 and a bottom bipolar plate 290. The mesh current collector 287 is formed of a suitable metal for making electrical contact between the negative electrode terminal 280 and the bottom bipolar plate 290. For example, the mesh current collector 287 is preferably formed of nickel or copper. The mesh current collector 287 has a grid-like pattern with square- or rectangular-shaped holes between portions of the metal. The mesh current collector 287 has a thickness in the Z-direction of approximately 30-50 µm. The mesh current collector 287 has a length in the Y-direction and a width in the X-direction that are less than the length and width of the negative electrode terminal 280, respectively. The mesh current collector 287 is dimensioned in the X- and Y-directions so as to fit inside the frame of the negative electrode terminal 280.

The bottom bipolar plate 290 is disposed below the mesh current collector 287 in the Z-direction. The bottom bipolar plate 290 includes a plurality of semi-circular fuel flow channels 292 and has holes 295 formed in each corner of the bottom bipolar plate 290. The bottom bipolar plate 290 can be formed of any suitable metal for a bipolar plate. For example, the bottom bipolar plate 290 can be formed of a stainless steel material, such as SS 330, SS 441 or Crofer 22, preferably SS 441. A total width of the bottom bipolar plate 290 in the X-direction ranges from 10 cm to 50 cm, and is preferably 20 cm. The thickness of the bottom bipolar plate 290 in the Z-direction ranges from 500 µm to 800 µm, and a length of the bottom bipolar plate 290 in the Y-direction is between 10 cm and 50 cm, preferably 40 cm.

The gas flow channels 292 extend along the X-direction of the bipolar plate 290 to allow fuel flow to the fuel cell 200. The gas flow channels 292 have a width of approximately 10 µm to 500 µm, preferably 100 µm to 250 µm, in the X-direction, and a height of approximately 10 µm to 500 µm, preferably 100 µm to 250 µm, in the Z-direction. The gas flow channels 292 also have a semi-circular shape.

The bipolar plate 290 also includes two grooves 298 disposed on opposite sides of the bipolar plate 290 in the X-direction. The grooves 298 each have a width of a width of approximately 5 mm in the X-direction and a length of approximately 170 mm in the Y-direction.

The holes 215, 225, 275, 285 and 295 are any suitable size to accommodate a sleeve surrounding a hollow fastener. Each of the holes 215, 225, 275, 285 and 295 have a length of approximately 5-10 mm in the Y-direction and a width of approximately 5-10 mm in the X-direction. For example, the holes 215, 225, 275, 285 and 295 can each have a square shape with a length and width of 5 mm×5 mm or 10 mm×10 mm, or the holes 215, 225, 275, 285 and 295 can have a rectangular shape with a length in the Y-direction of 10 mm and a width in the X-direction of 5 mm. No holes are formed in the cathode 240, the electrolyte 250 or the anode 260.

FIG. 5 shows a hollow fastener 300 according to a third embodiment. The hollow fastener 300 is a metal screw 310 having a channel 320 formed down a center axis thereof and grooves 322 that form a sealing seat in the hollow fastener 300.

The metal screw 310 is formed of any suitable metal material for use as a fastener in a SOFC stack. For example, the metal screw 310 may be formed of a stainless steel material and is preferably formed of a SS 440 material. The metal screw 310 has a length ranging from 10 cm to 24 cm. The channel 320 extends along the entire length of the screw 310. The channel 320 has a diameter of approximately 500 µm to 10 mm, preferably 1 mm to 5 mm.

The metal screw 310 also includes a head 330 and a lower body 340. The head 330 has a diameter of 1.2 cm, and the lower body 340 has a diameter of approximately 0.8 cm. However, it should be understood that any suitable diameters may be used for the head 330 and the lower body 340, as long as the head 330 has a larger diameter than the lower body 340 and the diameters do not adversely affect the mechanical strength of a fuel cell stack that includes the hollow fastener 300. The channel 320 is formed by drilling a hole in a top surface of the head 330 so that the channel 320 extends through the entire length of the metal screw 310. As shown in FIG. 5, the grooves 322 do not extend all the way through the head 330 and instead have a height and a width that are each approximately 0.1-5 mm. The lower body 340 includes threaded portions 345.

The metal screw 310 also includes a plurality of air holes 350 and fuel holes 360 formed in the lower body 340. As shown in FIG. 5, the air holes 350 and fuel holes 360 each extend from an exterior surface of the lower body 340 to the channel 320 formed down the center axis of the screw 310. As such, the air holes 350 and fuel holes 360 extend through an entire thickness of the lower body 340 of the metal screw 310. The air holes 350 and fuel holes 360 each have a diameter of approximately 500 µm to 10 mm, preferably 1 mm to 3 mm.

The metal screw 310 is coated with an insulating material 370. The insulating material 370 is any suitable insulating material. For example, the insulating material 370 can include at least one of: silicate glass, a silicate/glass-ceramic, a Ba—Al—B—La silicate/glass-ceramic, and a Sr—Ca—B—Zn—Ti silicate glass-ceramic. The insulating material 370 has a thickness of 20-50 μm. As shown in FIG. 5, the insulating material 370 is formed on the exterior surface of the screw 310, including the exterior surface of the lower body 340, and within the channel 320. Although not shown, it should be understood that the insulating material 370 may also cover the interior of air holes 350 and fuel holes 360.

FIG. 6 shows a sleeve 400 according to a fourth embodiment. The sleeve 400 is formed by a hollow insulating sleeve 410 having a hole 420 formed down a center axis thereof. The insulating sleeve 410 is formed of any suitable insulating material. For example, the insulating sleeve 410 may be formed of a YSZ-glass composite comprising YSZ and glass, preferably 50% by volume of YSZ and 50% by volume of glass. The insulating sleeve has a thickness of approximately 20-50 μm. The hole 420 has a diameter suitable to accommodate a hollow fastener, such as 0.4-1 cm, preferably 0.4-0.6 cm.

The insulating sleeve 410 also includes a plurality of grooves 430 surrounding air flow channels 440 and fuel flow channels 450. The grooves 430 do not extend all the way through to an interior surface of the insulating sleeve 410 and instead have a depth that in the X-direction that is less than the thickness of the insulating sleeve 410.

The air flow channels 440 and the fuel flow channels 450 penetrate the entire thickness of the insulating sleeve 410 such that they form long holes in the insulating sleeve 410. The air flow channels 440 and the fuel flow channels 450 each have a length in the Y-direction of approximately 5 mm and a height in the Z-direction of approximately 100 μm. The air flow channels 440 and fuel flow channels 450 are spaced apart from each other such that the air flow channels 440 and the fuel flow channels 550 align with the holes formed in the lower body of a hollow fastener that is accommodated in the sleeve. The air flow channels 440 and the fuel flow channels 450 are also spaced apart such that they align with the air flow channels and fuel flow channels, respectively, in the bipolar plates of a fuel cell stack that includes the insulating sleeve 410.

Figure 7:
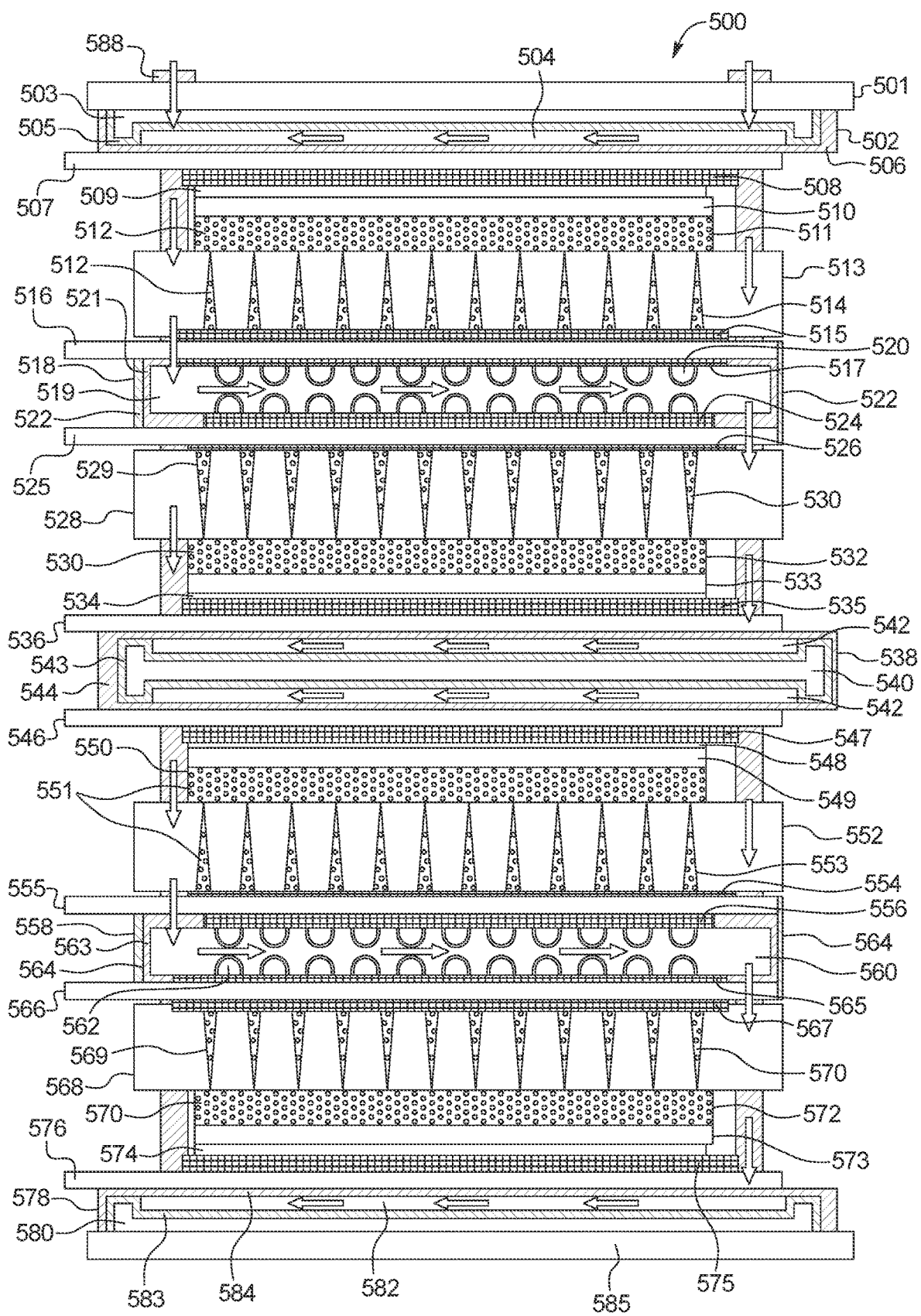
FIG. 7 is a cross-sectional view of a fuel cell stack including hollow fasteners according to an embodiment.

FIG. 7 shows a solid oxide fuel cell stack 500 in accordance with a fifth embodiment. The solid oxide fuel cell stack 500 includes four fuel cells that are stacked with bipolar plates between each cell. However, it should be understood that the solid oxide fuel cell stack 500 can include several more fuel cells in order to generate enough power for a given application. In particular, the solid oxide fuel cell stack 500 can include enough fuel cells to generate 100 kW of energy, preferably at least 100 fuel cells. The solid oxide fuel cell stack 500 can be incorporated in a drone, an electric vehicle, a combined heat-generating and power-generating device, or any other suitable mobile device.

The fuel cell stack 500 includes a top end plate 501 that acts as a current collector. The top end plate 501 is a metal plate formed of, for example, stainless steel, preferably a SS 440 series metal. The top end plate 501 has a width in the X-direction that is greater than the width of an air side bipolar plate 502. The top end plate 501 has a width in the X-direction of 10 cm to 30 cm, a length in the Y-direction of 10 cm to 60 cm and a thickness in the Z-direction of 0.3 cm to 1 cm.

The top end plate 501 is coated with a sealant. The sealant is an insulating material for sealing the fuel cell stack 500 and preferably includes a YSZ ceramic material. The sealant can also contain glass to prevent fusion at low temperatures of less than 700° C. However, it should be understood that any suitable insulating material may be used as the sealant, as long as the insulating material can be coated on the metal top end plate 501 at a temperature of less than 700° C. For example, the sealant can include at least one of: silicate glass, a silicate/glass-ceramic, a Ba—Al—B—La silicate/glass-ceramic, and a Sr—Ca—B—Zn—Ti silicate glass-ceramic. The sealant has a thickness of approximately 10 μm to 20 μm.

The fuel cell stack 500 also includes a bipolar plate 502. The bipolar plate 502 includes a metal plate 503, a plurality of semi-circular channels 504 formed on the bottom surface of the metal plate 503, a first coating 505 and a second coating 506. The metal plate 503 can be any suitable metal for a bipolar plate. For example, the metal plate can be formed of a stainless steel material, such as SS 330, SS 441 or Crofer 22, preferably SS 441. A total width of the bipolar plate 503 in the X-direction, including the first coating 505 and the second coating 506, ranges from 10 cm to 50 cm, and is preferably 20 cm. The thickness of the bipolar plate 503 in the Z-direction ranges from 500 μm to 800 μm, and a length of the bipolar plate 503 in the Y-direction ranges from 10 cm to 50 cm, preferably 40 cm.

The plurality of semi-circular channels 504 extend along the bottom surface of the metal plate 503 in the X-direction such that air flows in the X-direction along the semi-circular channels 504. However, as shown in FIG. 7, the semi-circular channels 504 do not extend along the entire width of the metal plate 503 in the X-direction.

The semi-circular channels 504 are formed as cavities in the bottom surface of the metal plate 503 and each have a width or diameter of approximately 10 μm to 500 μm, preferably 100 μm to 250 μm, in the Y-direction, and a height of approximately 10 μm to 500 μm, preferably 100 μm to 250 μm, in the Z-direction. Although not shown in the cross-sectional view of FIG. 7, the semi-circular channels 504 are spaced apart on the bottom surface of the metal plate 503 at regular intervals of approximately 10 μm to 500 μm, preferably 100 μm to 250 μm, between each of the semi-circular channels 504 in the Y-direction. However, it should be understood that the semi-circular channels 504 can include only one channel or can be formed at irregular intervals along the bottom surface of the metal plate 503 in the Y-direction. Air flows along the semi-circular channels 504 in the X-direction.

The metal plate 503 is covered by the first coating 505. The first coating 505 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 500. For example, the first coating 504 can include at least one Cu—Mn based spinel, such as $CuNi_{0.2}Mn_{1.8}O_4$, or at least one Mn—Co based spinel, such as $MnCo_2O_4$.

The first coating 505 covers a part of the top surface of the metal plate 503, a part of the bottom surface of the metal plate 503 including the semi-circular channels 504, and both edges of the metal plate 503. The first coating 505 is dense and has a thickness of approximately 1 μm to 10 μm. However, it should be understood that the first coating 505 can cover the entire metal plate 503 or can cover only the semi-circular channels 504, as long as the first coating 505 covers at least the entirety of the semi-circular channels 504.

Alternatively, the first coating 505 can be a bi-layer coating including a bottom layer closer to the surface of the metal plate 503 that includes the non-metal oxide coating, and a top or outer layer that includes a reforming catalyst.

The reforming catalyst layer has a thickness of approximately 20 μm to 50 μm, and the non-metal oxide layer has a thickness of approximately 1 μm to 10 μm.

The second coating 506 is an insulating material that seals the metal plate 503. The second coating 506 preferably includes a YSZ ceramic and can also contain glass to prevent fusion at low temperatures of less than 700° C. Any suitable insulating material may be used as the second coating 506, as long as the insulating material can be coated on the metal plate 503 at a temperature of less than 700° C. For example, the second coating 506 can include at least one of: silicate glass, a silicate/glass-ceramic, a Ba—Al—B—La silicate/glass-ceramic, and a Sr—Ca—B—Zn—Ti silicate glass-ceramic. The second coating 506 has a thickness of approximately 10 μm to 20 μm.

The solid oxide fuel cell stack 500 also includes a positive electrode terminal 507. As shown in FIG. 7, the positive electrode terminal 507 is in contact with the second coating 506 on the bipolar plate 503. The positive electrode terminal 507 is formed of any suitable metal. For example, the positive electrode terminal 507 can be formed of copper or a stainless steel material such as Crofer. The positive electrode terminal 507 has a frame-like shape with a rectangular-shaped hole formed in the center thereof to allow air to flow therethrough. The positive electrode terminal 507 has a lead that protrudes from the cell stack 500 with a width in the X-direction of approximately 1 cm to 2 cm. The positive electrode terminal 507 also has a length in the Y-direction of approximately 3 cm to 15 cm and a thickness in the Z-direction of approximately 0.01 cm to 0.3 cm. It should be understood that the positive electrode terminal 507 has any suitable shape and dimensions such that air can flow therethrough.

The solid oxide fuel cell stack 500 includes a mesh current collector 508 in contact with both the positive electrode terminal 507 and the cathode 509 of the first fuel cell. The first fuel cell includes the cathode 509, an electrolyte 510, an anode 511 and a metal substrate 513. The mesh current collector 508 is formed of a suitable metal for making electrical contact between the positive electrode terminal 507 and the cathode 509. For example, the mesh current collector 508 is preferably formed of nickel or copper. The mesh current collector 508 has a grid-like pattern with square- or rectangular-shaped holes between portions of the metal. The mesh current collector 508 has a thickness in the Z-direction of approximately 30-50 μm. The mesh current collector 508 has a length in the Y-direction and a width in the X-direction that are less than the length and width of the positive electrode terminal 507, respectively.

The cathode 509 can be the same as the cathode 18 or 68 of the first embodiment. For example, the cathode 509 has a thickness of 20-30 μm in the Z-direction and is formed of any suitable cathode material for a SOFC. For example, the cathode 509 is formed of a porous low temperature material that sinters at a temperature of 850° C. or less, such as SSC having the formula $SrSmCoO_3$, $PrBaSrCoFeO$, or any suitable perovskite oxide having the general formula $ABO_3$. The cathode 509 is formed of a material with a porosity of 30-60%.

The electrolyte 510 can be the same as the electrolyte 20 or 64 of the first embodiment. For example, the electrolyte 510 is formed of a solid oxide ceramic material and has a thickness of approximately 5-15 μm in the Z-direction, preferably 10 μm or less. The solid oxide ceramic material can be any suitable solid oxide ceramic material, for example ScCeSZ. The solid oxide ceramic material is dense and has a porosity of 1% or less.

The anode 511 can be the same as the anode 24 or 62 of the first embodiment. For example, the anode 511 is formed of a porous anode material 512 having a plurality of pores formed therein. The anode 511 has a thickness of approximately 2.5-15 μm, preferably 7-15 μm in the Z-direction. The porous anode material 512 is formed on the top surface of the metal substrate 513 and within holes 514 in the metal substrate 513. The anode material 512 has a porosity of approximately 30-50% and includes a metal oxide and a solid oxide ceramic material.

For example, the metal oxide may be NiO, and the solid oxide ceramic material may be ScCeSZ. The porous anode material 512 includes approximately 40-60% by volume of NiO and approximately 40-60% by volume of ScCeSZ. The porous anode material 512 preferably includes 50% by volume of NiO and 50% by volume of ScCeSZ. However, the porous anode material 512 may optionally include additives such as tin (Sn). It should be understood that the ScCeSZ material also includes gadolinium (Gd) as a dopant for the ceria (CeO) in the ScCeSZ material. The pores have a size or diameter of approximately 1-5 μm.

The metal substrate 513 is formed of can be the same as the metal substrate 30 or 54 of the first embodiment. For example, the metal substrate 513 is any suitable metal for use in a metal-supported SOFC, such as stainless steel, preferably SS type 440. The metal has a porosity of approximately 30-50% and a thickness of approximately 250-600 μm, preferably no greater than 350 μm. For example, the metal 513 has a thickness of 300 μm in the Z-direction and a width of 30 mm in the X-direction.

The plurality of holes 514 each has a different size at one surface of the metal substrate 513 than at the opposite surface as shown in FIG. 7. For example, the plurality of holes 514 each has a diameter of approximately 40-60 μm at the bottom surface of the metal substrate 513 and a diameter of approximately 5-20 μm at the top surface of the metal substrate 513 that is in contact with the anode 511.

The plurality of holes 514 are not formed at a distance of 2-5 mm from the edges of the metal substrate 513 in the X-direction. Preferably, the holes 514 do not make up more than 30-50% of the surface area of the metal substrate 513. As shown in FIG. 7, the holes 514 each have a V-shape in which the diameter of the hole is different at one surface of the metal substrate 513 than at the opposite surface. However, it should be understood that the holes 514 may have any suitable shape. For example, the holes 514 may have a same diameter of approximately 5-60 μm throughout the metal substrate 513. Furthermore, although the holes 514 in FIG. 7 each have a uniform shape and size, the plurality of holes 514 in the metal substrate 513 may have varying shapes and sizes.

The solid oxide fuel cell stack 500 includes a metal mesh 515. The metal mesh 515 is in contact with both the metal substrate 513 and the negative electrode terminal 516. The metal mesh 515 is formed of a suitable metal for making electrical contact between the metal substrate 513 and the negative electrode terminal 516, preferably nickel or copper. The metal mesh 515 has a grid-like pattern with square- or rectangular-shaped holes between portions of the metal. The metal mesh 515 has a thickness in the Z-direction of approximately 30-50 μm, and a length in the Y-direction and a width in the X-direction that are less than the length and width of the metal substrate 513, respectively.

The negative electrode terminal 516 is in contact with both the metal mesh 515 and a metal mesh 517. The negative electrode terminal 516 is formed of any suitable metal, such as copper or a stainless steel material, for example Crofer.

The negative electrode terminal 516 has a frame-like shape with a rectangular-shaped hole formed in the center thereof to allow fuel to flow therethrough. The negative electrode terminal 516 has a lead that protrudes from the cell stack with a width in the X-direction of approximately 1 cm to 2 cm. The negative electrode terminal 516 has a length in the Y-direction of approximately 3 cm to 15 cm and a thickness in the Z-direction of approximately 0.01 cm to 0.3 cm. It should be understood that the negative electrode terminal 516 has any suitable shape and dimensions such that fuel can flow therethrough.

The metal mesh 517 of the solid oxide fuel cell stack 500 is in contact with both the negative electrode terminal 516 and the bipolar plate 518. The metal mesh 517 is formed of a suitable metal for making electrical contact between the negative electrode terminal 516 and the bipolar plate 518, preferably nickel or copper. The metal mesh 517 has a grid-like pattern with square- or rectangular-shaped holes between portions of the metal. The metal mesh 517 has a thickness in the Z-direction of approximately 30-50 µm. The metal mesh 517 has a length in the Y-direction and a width in the X-direction that are less than the length and width of the metal substrate 513, respectively.

The bipolar plate 518 can be the same as bipolar plate 49 of the first embodiment. For example, the bipolar plate 518 includes a metal plate 519, a plurality of semi-circular channels 520 formed on the top and bottom surfaces of the metal plate 519, a first coating 521 and a second coating 522. The metal plate 519 can be any suitable metal for a bipolar plate. For example, the metal plate can be formed of a stainless steel material, such as SS 330, SS 441 or Crofer 22, preferably SS 441. A total width of the bipolar plate 518 in the X-direction, including the first coating 521 and the second coating 522, ranges from 10 cm to 50 cm, and is preferably 20 cm. The bipolar plate 518 has a thickness in the Z-direction of 500 µm to 800 µm, and a length in the Y-direction of 10 cm to 50 cm, preferably 40 cm.

The semi-circular channels 520 are formed as cavities in both the top and bottom surfaces of the metal plate 519. The semi-circular channels 520 have a rounded shape with no defined edge as shown in FIG. 7. The semi-circular channels 520 each have a width or diameter of approximately 10 µm to 500 µm, preferably 100 µm to 250 µm, in the X-direction, and a height of approximately 10 µm to 500 µm, preferably 100 µm to 250 µm, in the Z-direction. The semi-circular channels 520 are spaced apart on the top and bottom surfaces of the metal plate 519 at regular intervals of approximately 10 µm to 500 µm, preferably 100 µm to 250 µm, between each of the semi-circular channels 520. However, it should be understood that the semi-circular channels 520 can include only one channel or can be formed at irregular intervals along the top and bottom surfaces of the metal plate 519. As shown in FIG. 7, fuel flows along the semi-circular channels 520 in the Y-direction.

The first coating 521 is a non-metal oxide coating, preferably manganese cobalt oxide. The non-metal oxide coating can be any suitable anti-corrosive coating that prevents the formation of chromium oxide (CrO) and rust on the air or cathode side of the fuel cells in the solid oxide fuel cell stack 500.

As shown in FIG. 7, the first coating 521 covers a part of the top surface of the metal plate 519 including the semi-circular channels 520, a part of the bottom surface of the metal plate 519 including the semi-circular channels 520, and both edges of the metal plate 519. The first coating 521 is dense and has a thickness of approximately 1 µm to 10 µm. However, the first coating 521 can cover the entire metal plate 519 or can cover only the semi-circular channels 520, as long as the first coating 521 covers at least the entirety of the semi-circular channels 520.

The first coating 521 can alternatively be a bi-layer coating including a bottom layer closer to the surface of the metal plate 519 that includes the non-metal oxide coating, and a top layer that includes a reforming catalyst. The reforming catalyst includes at least one of a Ni—Cu—Co—Fe—Mn—O-doped ceria composite, a Ru—Ce—Zr alloy, a Ni—Fe-ceria alloy, a nickel metal oxide alloy, Ni—$CeO_2$, Ni—$CeO_2$ (doped with Gd, Sm), Ni-PrOx, Pd—$CeO_2$, Ni—Fe—$CeO_2$, and combinations of noble metal and Ni with $CeO_2$ and/or Ce—Zr-transition metal composites. The reforming catalyst layer has a thickness of approximately 20 µm to 50 µm, and the non-metal oxide layer has a thickness of approximately 1 µm to 10 µm.

The second coating 522 is an insulating material that seals the metal plate 519. The second coating 522 preferably includes a YSZ ceramic and can also contain glass to prevent fusion at low temperatures of less than 700° C. Any suitable insulating material may be used as the second coating 522, as long as the insulating material can be coated on the metal plate 519 at a temperature of less than 700° C. For example, the second coating 522 can include at least one of: silicate glass, a silicate/glass-ceramic, a Ba—Al—B—La silicate/glass-ceramic, and a Sr—Ca—B—Zn—Ti silicate glass-ceramic. The second coating 522 has a thickness of approximately 10 µm to 20 µm.

The solid oxide fuel cell stack 500 includes a metal mesh 524 that is in contact with both the bipolar plate 518 and a negative electrode terminal 525. The metal mesh 524 is formed of a suitable metal for making electrical contact between the bipolar plate 518 and the negative electrode terminal 525. For example, the metal mesh 524 is preferably formed of nickel or copper and has a grid-like pattern with square- or rectangular-shaped holes between portions of the metal. The metal mesh 524 has a thickness in the Z-direction of approximately 30-50 µm and a length in the Y-direction and a width in the X-direction that are less than the length and width of the bipolar plate 518, respectively.

The solid oxide fuel cell stack 500 also includes the negative electrode terminal 525 and a metal mesh 526. As shown in FIG. 7, the negative electrode terminal 525 is in contact with both the metal mesh 524 and the metal mesh 526. The negative electrode terminal 525 is formed of any suitable metal, such as copper or a stainless steel material, for example Crofer. The negative electrode terminal 525 has a frame-like shape with a rectangular-shaped hole formed in the center thereof to allow fuel to flow therethrough. The negative electrode terminal 525 has a lead that protrudes from the cell stack with a width in the X-direction of approximately 1 cm to 2 cm. The negative electrode terminal 525 has a length in the Y-direction of approximately 3 cm to 15 cm and a thickness in the Z-direction of approximately 0.01 cm to 0.3 cm. It should be understood that the negative electrode terminal 525 has any suitable shape and dimensions such that fuel can flow therethrough.

The metal mesh 526 is provided between the negative electrode terminal 525 and a metal substrate 528 of a second fuel cell. The second fuel cell includes the metal substrate 528, an anode 532, an electrolyte 533, and a cathode 534.

The metal mesh 526 is in contact with both the negative electrode terminal 525 and the metal substrate 528. The metal mesh 526 is formed of a suitable metal for making electrical contact between the negative electrode terminal 525 and the metal substrate 528. For example, the metal mesh 526 is preferably formed of nickel or copper and has a grid-like pattern with square- or rectangular-shaped holes between portions of the metal. The metal mesh 526 has a thickness in the Z-direction of approximately 30-50 μm. The metal mesh 526 has a length in the Y-direction and a width in the X-direction that are less than the length and width of the metal substrate 528, respectively.

The metal substrate 528 of the second fuel cell is formed of a metal and has a plurality of holes 529 formed therein. A porous anode material 530 having a plurality of pores is formed on the bottom surface of the metal substrate 528 and within holes 529 in the metal substrate 528. The metal substrate 528, holes 529 and anode material 530 of the second fuel cell are the same as the metal substrate 513, the holes 514 and the anode material 512 of the first fuel cell, respectively, and thus, a detailed discussion of these features will be omitted. The anode 532 of the second fuel cell is formed of the porous anode material 530. The anode 532, electrolyte 533 and cathode 534 of the second fuel cell are the same as the anode 511, the electrolyte 510 and the cathode 509 of the first fuel cell, respectively. Thus, a detailed discussion of these features will be omitted.

The solid oxide fuel cell stack 500 includes a mesh current collector 535 in contact with both the cathode 534 of the second fuel cell and a positive electrode terminal 536. The mesh current collector 535 is formed of a suitable metal for making electrical contact between the cathode 534 and the positive electrode terminal 536, preferably nickel or copper. The mesh current collector 535 has a grid-like pattern with square- or rectangular-shaped holes between portions of the metal. The mesh current collector 535 has a thickness in the Z-direction of approximately 30-50 μm. The mesh current collector 535 has a length in the Y-direction and a width in the X-direction that are less than the length and width of a positive electrode terminal 536, respectively.

The positive electrode terminal 536 is in contact with a bipolar plate 538. The positive electrode terminal 536 is formed of any suitable metal. For example, the positive electrode terminal 536 can be formed of copper or a stainless steel material such as Crofer. The positive electrode terminal 536 has a frame-like shape with a rectangular-shaped hole formed in the center thereof to allow air to flow therethrough. The positive electrode terminal 536 has a lead that protrudes from the cell stack with a width in the X-direction of approximately 1 cm to 2 cm. The positive electrode terminal 536 also has a length in the Y-direction of approximately 3 cm to 15 cm and a thickness in the Z-direction of approximately 0.01 cm to 0.3 cm. It should be understood that the positive electrode terminal 536 has any suitable shape and dimensions such that air can flow therethrough.

The bipolar plate 538 includes a metal plate 540, a plurality of semi-circular channels 542 formed on the top and bottom surfaces of the metal plate 540, a first coating 543 and a second coating 544. The metal plate 540 can be any suitable metal for a bipolar plate. For example, the metal plate can be formed of a stainless steel material, such as SS 330, SS 441 or Crofer 22, preferably SS 441. A total width of the bipolar plate 538 in the X-direction, including the first coating 543 and the second coating 544, ranges from 10 cm to 50 cm, and is preferably 20 cm. The bipolar plate 538 has a thickness in the Z-direction of 500 μm to 800 μm, and a length in the Y-direction of 10 cm to 50 cm, preferably 40 cm.

The semi-circular channels 542 are formed as cavities in both the top and bottom surfaces of the metal plate 540 and each have a width or diameter of approximately 10 μm to 500 μm, preferably 100 μm to 250 μm, in the Y-direction, and a height of approximately 10 μm to 500 μm, preferably 100 μm to 250 μm, in the Z-direction. Although not shown in the cross-sectional view of FIG. 7, the semi-circular channels 542 are spaced apart on the top and bottom surfaces of the metal plate 540 at regular intervals of approximately 10 μm to 500 μm, preferably 100 μm to 250 μm, between each of the semi-circular channels 542 in the Y-direction. However, it should be understood that the semi-circular channels 542 can include only one channel or can be formed at irregular intervals along the bottom surface of the metal plate 540 in the Y-direction. Air flows along the semi-circular channels 542 in the X-direction.

The first coating 543 is the same as the first coating 504 of the bipolar plate 502, and the second coating 544 is the same as the second coating 505 of the bipolar plate 502, and, thus, a detailed discussion of the thickness and materials for those coatings will be omitted.

As shown in FIG. 7, the first coating 543 covers a part of the top surface of the metal plate 540 including the semi-circular channels 542, a part of the bottom surface of the metal plate 540 including the semi-circular channels 520, and both edges of the metal plate 540. The first coating 543 can cover the entire metal plate 540 or can cover only the semi-circular channels 542, as long as the first coating 543 covers at least the entirety of the semi-circular channels 542. The second coating 544 is an insulating material that seals the metal plate 540.

The fuel cell stack 500 also includes a positive electrode terminal 546 in contact with the bipolar plate 538 and a mesh current collector 547. The positive electrode terminal 546 is formed of any suitable metal. For example, the positive electrode terminal 546 can be formed of copper or a stainless steel material such as Crofer. The positive electrode terminal 546 has a frame-like shape with a rectangular-shaped hole formed in the center thereof to allow air to flow therethrough. The positive electrode terminal 546 has a lead that protrudes from the cell stack with a width in the X-direction of approximately 1 cm to 2 cm. The positive electrode terminal 546 also has a length in the Y-direction of approximately 3 cm to 15 cm and a thickness in the Z-direction of approximately 0.01 cm to 0.3 cm. It should be understood that the positive electrode terminal 546 has any suitable shape and dimensions such that air can flow therethrough.

The mesh current collector 547 is provided between the positive electrode terminal 546 and a cathode 548 of a third fuel cell. The third fuel cell includes the cathode 548, an electrolyte 549, an anode 550 and a metal substrate 552.

The mesh current collector 547 in contact with both the positive electrode terminal 546 and the cathode 548. The mesh current collector 547 is formed of a suitable metal for making electrical contact between the positive electrode terminal 546 and the cathode 548. For example, the mesh current collector 547 is preferably formed of nickel or copper and has a grid-like pattern with square- or rectangular-shaped holes between portions of the metal. The mesh current collector 547 has a thickness in the Z-direction of approximately 30-50 μm. The mesh current collector 547 has a length in the Y-direction and a width in the X-direction that are less than the length and width of the positive electrode terminal 546, respectively.

The anode 550 of the third fuel cell is formed of a porous anode material 551. The cathode 548, electrolyte 549 and anode 550 of the third fuel cell are the same as the cathode 509, the electrolyte 510 and the anode 511 of the first fuel cell, respectively. Thus, a detailed discussion of these features will be omitted.

The metal substrate 552 of the third fuel cell is formed of a metal and has a plurality of holes 553 formed therein. The porous anode material 551 having a plurality of pores is formed on the top surface of the metal substrate 552 and within holes 553 in the metal substrate 552. The metal substrate 552, holes 553 and anode material 551 of the third fuel cell are the same as the metal substrate 513, the holes 514 and the anode material 512 of the first fuel cell, respectively, and thus, a detailed discussion of these features will be omitted.

The solid oxide fuel cell stack 500 includes a metal mesh 554 in contact with both the metal substrate 552 and a negative electrode terminal 555. The metal mesh 554 is formed of a suitable metal for making electrical contact between the metal substrate 552 and the negative electrode terminal 555, preferably nickel or copper. The metal mesh 554 has a grid-like pattern with square- or rectangular-shaped holes between portions of the metal. The metal mesh 554 has a thickness in the Z-direction of approximately 30-50 μm, and a length in the Y-direction and a width in the X-direction that are less than the length and width of the metal substrate 552, respectively.

The negative electrode terminal 555 is in contact with both the metal mesh 554 and a metal mesh 556. The negative electrode terminal 555 is formed of any suitable metal, such as copper or a stainless steel material, for example Crofer. The negative electrode terminal 555 has a frame-like shape with a rectangular-shaped hole formed in the center thereof to allow fuel to flow therethrough. The negative electrode terminal 555 has a lead that protrudes from the cell stack with a width in the X-direction of approximately 1 cm to 2 cm. The negative electrode terminal 555 has a length in the Y-direction of approximately 3 cm to 15 cm and a thickness in the Z-direction of approximately 0.01 cm to 0.3 cm. It should be understood that the negative electrode terminal 555 has any suitable shape and dimensions such that fuel can flow therethrough.

The metal mesh 556 of the solid oxide fuel cell stack 500 is in contact with both the negative electrode terminal 555 and a bipolar plate 558. The metal mesh 556 is formed of a suitable metal for making electrical contact between the negative electrode terminal 555 and the bipolar plate 558, preferably nickel or copper. The metal mesh 556 has a grid-like pattern with square- or rectangular-shaped holes between portions of the metal. The metal mesh 556 has a thickness in the Z-direction of approximately 30-50 μm. The metal mesh 556 has a length in the Y-direction and a width in the X-direction that are less than the length and width of the metal substrate 552, respectively.

The bipolar plate 558 can be the same as the bipolar plate 518. For example, the bipolar plate 558 includes a metal plate 560, a plurality of semi-circular channels 562 formed on the top and bottom surfaces of the metal plate 560, a first coating 563 and a second coating 564. The metal plate 560 can be any suitable metal for a bipolar plate. For example, the metal plate can be formed of a stainless steel material, such as SS 330, SS 441 or Crofer 22, preferably SS 441. A total width of the bipolar plate 560 in the X-direction, including the first coating 563 and the second coating 564, ranges from 10 cm to 50 cm, and is preferably 20 cm. The bipolar plate 558 has a thickness in the Z-direction of 500 μm to 800 μm, and a length in the Y-direction of 10 cm to 50 cm, preferably 40 cm.

The semi-circular channels 562 are formed as cavities in both the top and bottom surfaces of the metal plate 560. The semi-circular channels 562 have a rounded shape with no defined edge as shown in FIG. 7. The semi-circular channels 562 each have a width or diameter of approximately 10 μm to 500 μm, preferably 100 μm to 250 μm, in the X-direction, and a height of approximately 10 μm to 500 μm, preferably 100 μm to 250 μm, in the Z-direction. The semi-circular channels 562 are spaced apart on the top and bottom surfaces of the metal plate 560 at regular intervals of approximately 10 μm to 500 μm, preferably 100 μm to 250 μm, between each of the semi-circular channels 562. However, it should be understood that the semi-circular channels 562 can include only one channel or can be formed at irregular intervals along the top and bottom surfaces of the metal plate 560. As shown in FIG. 7, fuel flows along the semi-circular channels 562 in the Y-direction.

The first coating 563 is the same as the first coating 521 of the bipolar plate 518, and the second coating 564 is the same as the second coating 522 of the bipolar plate 518, and, thus, a detailed discussion of the thickness and materials for those coatings will be omitted.

As shown in FIG. 7, the first coating 563 covers a part of the top surface of the metal plate 560 including the semi-circular channels 562, a part of the bottom surface of the metal plate 560 including the semi-circular channels 562, and both edges of the metal plate 560. The first coating 563 is dense and has a thickness of approximately 1 μm to 10 μm. However, the first coating 563 can cover the entire metal plate 560 or can cover only the semi-circular channels 562, as long as the first coating 563 covers at least the entirety of the semi-circular channels 562.

The solid oxide fuel cell stack 500 includes a metal mesh 565 that is in contact with both the bipolar plate 558 and a negative electrode terminal 566. The metal mesh 565 is formed of a suitable metal for making electrical contact between the bipolar plate 558 and the negative electrode terminal 566. For example, the metal mesh 565 is preferably formed of nickel or copper and has a grid-like pattern with square- or rectangular-shaped holes between portions of the metal. The metal mesh 565 has a thickness in the Z-direction of approximately 30-50 μm and a length in the Y-direction and a width in the X-direction that are less than the length and width of the bipolar plate 558, respectively.

The solid oxide fuel cell stack 500 also includes the negative electrode terminal 566 and a metal mesh 567. As shown in FIG. 7, the negative electrode terminal 566 is in contact with both the metal mesh 565 and the metal mesh 567. The negative electrode terminal 566 is formed of any suitable metal, such as copper or a stainless steel material, for example Crofer. The negative electrode terminal 566 has a frame-like shape with a rectangular-shaped hole formed in the center thereof to allow fuel to flow therethrough. The negative electrode terminal 566 has a lead that protrudes from the cell stack with a width in the X-direction of approximately 1 cm to 2 cm. The negative electrode terminal 566 has a length in the Y-direction of approximately 3 cm to 15 cm and a thickness in the Z-direction of approximately 0.01 cm to 0.3 cm. It should be understood that the negative electrode terminal 566 has any suitable shape and dimensions such that fuel can flow therethrough.

The metal mesh 567 is provided between the negative electrode terminal 566 and a metal substrate 568 of a fourth fuel cell. The fourth fuel cell includes the metal substrate 568, an anode 572, an electrolyte 573, and a cathode 574.

The metal mesh 567 is in contact with both the negative electrode terminal 566 and the metal substrate 568. The metal mesh 567 is formed of a suitable metal for making electrical contact between the negative electrode terminal 566 and the metal substrate 568. For example, the metal mesh 567 is preferably formed of nickel or copper and has a grid-like pattern with square- or rectangular-shaped holes between portions of the metal. The metal mesh 567 has a thickness in the Z-direction of approximately 30-50 µm. The metal mesh 567 has a length in the Y-direction and a width in the X-direction that are less than the length and width of the metal substrate 568, respectively.

The metal substrate 568 of the second fuel cell is formed of a metal and has a plurality of holes 569 formed therein. A porous anode material 570 having a plurality of pores is formed on the bottom surface of the metal substrate 568 and within holes 569 in the metal substrate 568. The metal substrate 568, holes 569 and anode material 570 of the fourth fuel cell are the same as the metal substrate 513, the holes 514 and the anode material 512 of the first fuel cell, respectively, and thus, a detailed discussion of these features will be omitted. The anode 572 of the fourth fuel cell is formed of the porous anode material 570. The anode 572, electrolyte 573 and cathode 574 of the fourth fuel cell are the same as the anode 511, the electrolyte 510 and the cathode 509 of the first fuel cell, respectively. Thus, a detailed discussion of these features will be omitted.

The solid oxide fuel cell stack 500 includes a mesh current collector 575 in contact with both the cathode 574 of the fourth fuel cell and a positive electrode terminal 576. The mesh current collector 575 is formed of a suitable metal for making electrical contact between the cathode 574 and the positive electrode terminal 576, preferably nickel or copper. The mesh current collector 575 has a grid-like pattern with square- or rectangular-shaped holes between portions of the metal. The mesh current collector 575 has a thickness in the Z-direction of approximately 30-50 µm. The mesh current collector 575 has a length in the Y-direction and a width in the X-direction that are less than the length and width of a positive electrode terminal 576, respectively.

The positive electrode terminal 576 is in contact with a bipolar plate 578. The positive electrode terminal 576 is formed of any suitable metal. For example, the positive electrode terminal 576 can be formed of copper or a stainless steel material such as Crofer. The positive electrode terminal 576 has a frame-like shape with a rectangular-shaped hole formed in the center thereof to allow air to flow therethrough. The positive electrode terminal 576 has a lead that protrudes from the cell stack with a width in the X-direction of approximately 1 cm to 2 cm. The positive electrode terminal 576 also has a length in the Y-direction of approximately 3 cm to 15 cm and a thickness in the Z-direction of approximately 0.01 cm to 0.3 cm. It should be understood that the positive electrode terminal 576 has any suitable shape and dimensions such that air can flow therethrough.

The bipolar plate 578 includes a metal plate 580, a plurality of semi-circular channels 582 formed on the bottom surface of the metal plate 580, a first coating 583 and a second coating 584. The metal plate 580 can be any suitable metal for a bipolar plate. For example, the metal plate can be formed of a stainless steel material, such as SS 330, SS 441 or Crofer 22, preferably SS 441. A total width of the bipolar plate 580 in the X-direction, including the first coating 583 and the second coating 584, ranges from 10 cm to 50 cm, and is preferably 20 cm. The thickness of the bipolar plate 580 in the Z-direction ranges from 500 µm to 800 µm, and a length of the bipolar plate 580 in the Y-direction ranges from 10 cm to 50 cm, preferably 40 cm.

The plurality of semi-circular channels 582 extend along the bottom surface of the metal plate 580 in the X-direction such that air flows in the X-direction along the semi-circular channels 582. However, as shown in FIG. 7, the semi-circular channels 582 do not extend along the entire width of the metal plate 580 in the X-direction.

The semi-circular channels 582 are formed as cavities in the top surface of the metal plate 580 and each have a width or diameter of approximately 10 µm to 500 µm, preferably 100 µm to 250 µm, in the Y-direction, and a height of approximately 10 µm to 500 µm, preferably 100 µm to 250 µm, in the Z-direction. Although not shown in the cross-sectional view of FIG. 7, the semi-circular channels 582 are spaced apart on the top surface of the metal plate 580 at regular intervals of approximately 10 µm to 500 µm, preferably 100 µm to 250 µm, between each of the semi-circular channels 582 in the Y-direction. However, it should be understood that the semi-circular channels 582 can include only one channel or can be formed at irregular intervals along the top surface of the metal plate 580 in the Y-direction. Air flows along the semi-circular channels 582 in the X-direction.

The first coating 583 is the same as the first coating 505 of the bipolar plate 502, and the second coating 584 is the same as the second coating 506 of the bipolar plate 502, and, thus, a detailed discussion of the thickness and materials for those coatings will be omitted.

As shown in FIG. 7, the first coating 583 covers a part of the bottom surface of the metal plate 580, a part of the top surface of the metal plate 580 including the semi-circular channels 582, and both edges of the metal plate 580. The first coating 583 is dense and has a thickness of approximately 1 µm to 10 µm. However, the first coating 583 can cover the entire metal plate 580 or can cover only the semi-circular channels 582, as long as the first coating 583 covers at least the entirety of the semi-circular channels 582.

The bottom end plate 585 acts as a current collector. The bottom end plate 585 is a metal plate formed of, for example, stainless steel, preferably a SS 440 series metal. The bottom end plate 585 has a width in the X-direction that is greater than the width of the air side bipolar plate 578. The width of the bottom end plate 585 in the X-direction ranges from 10 cm to 30 cm. The bottom end plate 585 has a length in the Y-direction of 10 cm to 60 cm and a thickness in the Z-direction ranging from 0.3 cm to 1 cm.

The bottom end plate 585 is coated with a sealant. The sealant is an insulating material for sealing the fuel cell stack 500 and preferably includes a YSZ ceramic material. The sealant can also contain glass to prevent fusion at low temperatures of less than 700° C. However, it should be understood that any suitable insulating material may be used as the sealant, as long as the insulating material can be coated on the metal bottom end plate 585 at a temperature of less than 700° C. For example, the sealant can include at least one of: silicate glass, a silicate/glass-ceramic, a Ba—Al—B—La silicate/glass-ceramic, and a Sr—Ca—B—Zn—Ti silicate glass-ceramic. The sealant has a thickness of approximately 10 µm to 20 µm.

The fuel cell stack also includes hollow screws 588 that are coated with an insulating material. The hollow screws 588 may be any suitable hollow fastener according to an embodiment herein, for example the hollow screws can be the hollow screws 84 of FIG. 2, the hollow screws 300 of FIG. 5, or the hollow screws 700 of FIG. 8. The insulating material for the screws 588 can include at least one of: silicate glass, a silicate/glass-ceramic, a Ba—Al—B—La silicate/glass-ceramic, and a Sr—Ca—B—Zn—Ti silicate glass-ceramic. The hollow screws 588 have a length ranging from 10 cm to 24 cm and a diameter of approximately 0.8 cm. The head of each of the screws 588 has a diameter of 1.2 cm. Furthermore, the hollow screws 588 have a plurality of holes formed in the lower body of the screws 588, and a hollow central axis forming a gas flow channel with a diameter of approximately 500 µm to 10 mm, preferably 1 mm to 5 mm.

Although FIG. 7 shows a configuration in which two air side bipolar plates 502 and 578 are each provided at opposite ends of the cell stack for air to flow to a cathode of a fuel cell, it should be understood that the fuel cell stack 500 may be configured such that two anode side bipolar plates are closest to the end plates. In such a configuration, the positive electrode terminals 507, 536, 546 and 576 would be replaced with negative electrode terminals, negative electrode terminals 516, 525, 555 and 556 would be replaced with positive electrode terminals, the air side bipolar plates 502, 538 and 578 would be replaced with fuel side bipolar plates that each allow fuel to flow to an anode of a fuel cell, and fuel side bipolar plates 518 and 558 would be replaced with air side bipolar plates that allows air to flow to cathodes that face each other.

It should also be understood that any suitable cathode gas may be used instead of air. Furthermore, it should be understood that, although the semi-circular channels 504, 542 and 582 extend along the X-direction and the semi-circular channels 520 and 562 extend along the Y-direction, the semi-circular channels 504, 542 and 582 can be configured to extend along the Y-direction and the semi-circular channels 520 and 562 can be configured to extend along the X-direction, as long as the semi-circular channels 504, 542 and 582 extend in the same direction and such direction is transverse to the direction in which the semi-circular channels 520 and 562 extend.

Figure 8A:
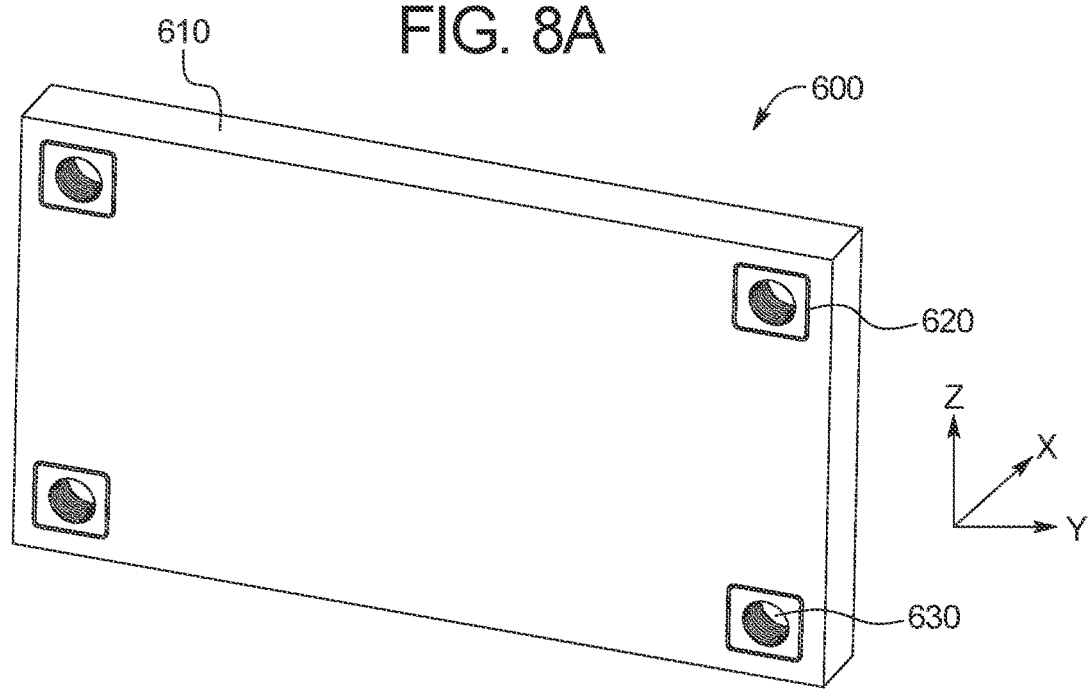
FIG. 8A is perspective view of a bottom end plate according to one embodiment.

FIG. 8A shows a bottom end plate 600 of a fuel cell stack in accordance with a sixth embodiment. The bottom end plate 600 acts as a current collector for the fuel cell stack and is formed of a metal plate 610. The metal plate 610 is formed of any suitable metal, for example stainless steel, preferably a SS 440 series metal. The metal plate 610 has a width in the X-direction that ranges from 10 cm to 30 cm, a length in the Y-direction of 10 cm to 60 cm, and a thickness in the Z-direction ranging from 0.3 cm to 1 cm. The bottom end plate 610 is coated with a sealant (not shown). The sealant is an insulating material for sealing the fuel cell stack and preferably includes a YSZ ceramic material. The sealant can also contain glass to prevent fusion at low temperatures of less than 700° C. It should be understood that any suitable insulating material may be used as the sealant for the bottom end plate 600, as long as the insulating material can be coated on the metal plate 610 at a temperature of less than 700° C. For example, the sealant can include at least one of: silicate glass, a silicate/glass-ceramic, a Ba—Al—B—La silicate/glass-ceramic, and a Sr—Ca—B—Zn—Ti silicate glass-ceramic. The sealant has a thickness of approximately 10 µm to 20 µm.

Figure 8B:
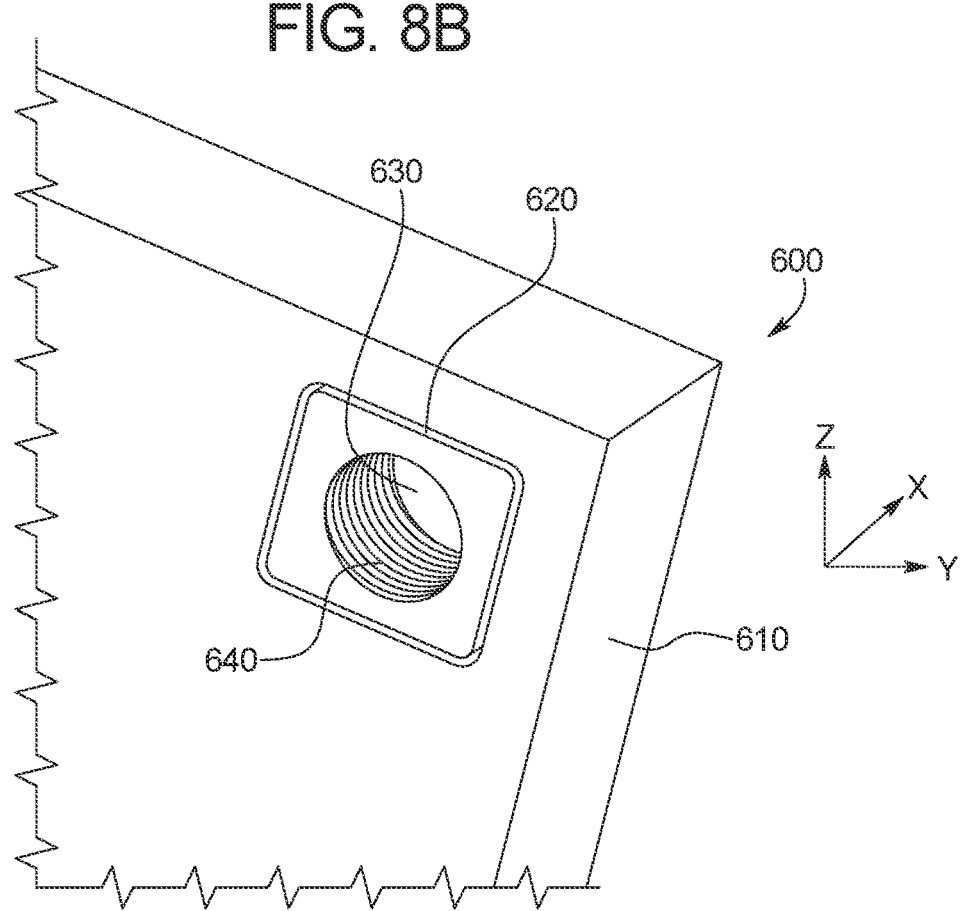
FIG. 8B is an exploded perspective view of the bottom end plate of FIG. 8A.

As shown in FIGS. 8A and 8B, the bottom end plate 600 includes four square-shaped grooves 620 for accommodating a gasket. However, it should be understood that any suitable shape may be used for the grooves 620, as long as the grooves 620 are larger than the square insulating sleeve surrounding the hollow fasteners and can accommodate the gasket to seal the fuel cell stack. The grooves 620 each have a depth of approximately 0.5-1 mm in the Z-direction to accommodate a sealant, a width in the X-direction of approximately 8-12 mm, and a length in the Y-direction of approximately 8-12 mm. For example, the grooves may have a width and length of 8×8 mm or 12×12 mm.

The bottom end plate 600 also includes a plurality of holes 630 that have threads 640. The holes 630 have a diameter of approximately 0.8-1 cm to accommodate hollow fasteners.

The threads 640 of the holes 630 are configured to be aligned with the threads on the lower body of the hollow fasteners.

FIG. 9 shows a hollow fastener 700 surrounded by a sleeve 750 according to a seventh embodiment. The hollow fastener 700 is a metal screw 710 having a channel 715 formed down a center axis thereof. The metal screw 710 is formed of any suitable metal material for use as a fastener in a SOFC stack. For example, the metal screw 710 may be formed of a stainless steel material and is preferably formed of a SS 440 material. The metal screw 710 has a length ranging from 10 cm to 24 cm. The channel 715 extends along the entire length of the screw 710. The channel 715 has a diameter of approximately 500 µm to 10 mm, preferably 1 mm to 5 mm.

The metal screw 710 also includes a head 720, grooves 722 and a lower body 725. The head 720 has a diameter of 1.2 cm, and the lower body 725 has a diameter of approximately 0.8 cm. However, it should be understood that any suitable diameters may be used for the head 720 and the lower body 725, as long as the head 720 has a larger diameter than the lower body 725 and the diameters do not adversely affect the mechanical strength of a fuel cell stack that includes the hollow fastener 700. The channel 715 is formed by drilling a hole in a top surface of the head 720 so that the channel 715 extends through the entire length of the metal screw 710.

The grooves 722 are formed in the lower surface of the head 720 to form a sealing seat. As shown in FIG. 9, the grooves 722 do not extend all the way through the head 90 and instead have a height and a width that are each approximately 0.1-5 mm.

The metal screw 710 also includes a plurality of air holes 730 and fuel holes 740 formed in the lower body 725. As shown in FIG. 9, the air holes 730 and fuel holes 740 each extend from an exterior surface of the lower body 725 to the channel 715 formed down the center axis of the screw 710. As such, the air holes 730 and fuel holes 740 extend through an entire thickness of the lower body 725 of the metal screw 710. The air holes 730 and fuel holes 740 each have a diameter of approximately 500 µm to 10 mm, preferably 1 mm to 3 mm. The lower body 725 also includes threaded portions 745.

The metal screw 710 is coated with an insulating material 748. The insulating material 748 is any suitable insulating material. For example, the insulating material 748 can include at least one of: silicate glass, a silicate/glass-ceramic, a Ba—Al—B—La silicate/glass-ceramic, and a Sr—Ca—B—Zn—Ti silicate glass-ceramic. The insulating material 748 has a thickness of 20-50 µm. As shown in FIG. 9, the insulating material 748 is formed on the exterior surface of the screw 710, including the exterior surface of the lower body 725, and within the channel 715. Although not shown, it should be understood that the insulating material 748 may also cover the interior of air holes 730 and fuel holes 740.

FIG. 9 also shows a hollow insulating sleeve 750 surrounding the hollow fastener 700. The sleeve 750 has a central space that accommodates the hollow fastener 700. The insulating sleeve 750 is formed of any suitable insulating material. For example, the insulating sleeve 750 may be formed of a YSZ-glass composite comprising YSZ and glass, preferably 50% by volume of YSZ and 50% by volume of glass. The insulating sleeve has a thickness of approximately 20-50 µm. The central space of the sleeve 750 has a sufficient size to accommodate the hollow fastener 700.

The insulating sleeve 750 also includes a plurality of grooves 760 surrounding air flow channels 770 and fuel flow channels 780. The grooves 760 do not extend all the way through to an interior surface of the insulating sleeve 750 and instead have a depth that in the X-direction that is less than the thickness of the insulating sleeve 750.

The air flow channels 770 and the fuel flow channels 780 penetrate the entire thickness of the insulating sleeve 750 such that they form long holes in the insulating sleeve 6750. The air flow channels 770 and the fuel flow channels 780 each have a length in the Y-direction of approximately 5 mm and a height in the Z-direction of approximately 100 µm. The air flow channels 770 and fuel flow channels 780 are spaced apart from each other and may optionally be aligned with the fuel holes 740 formed in the lower body 725 of the hollow fastener 700. The air flow channels 770 and the fuel flow channels 780 are also spaced apart and may optionally be aligned with the air flow channels and fuel flow channels, respectively, in the bipolar plates of a fuel cell stack that includes the insulating sleeve 750.

As shown in FIG. 9, when the hollow fastener 700 is accommodated in or surrounded by the insulating sleeve 750, there is a space 790 between the insulating sleeve 750 and the hollow fastener 700 that acts as a sealing seat for the fuel cell stack. The space 790 between the hollow fastener 700 and the insulating sleeve 750 is 1 mm to 5 mm.

As shown in FIG. 9, the hollow fastener 700 and insulating sleeve 750 are connected to a bipolar plate 795 of a fuel cell stack. In particular, the threads 745 of the hollow fastener 700 are configured to mate with the threaded hole 796 formed in a corner of the bipolar plate 795. The bipolar plate also includes a square-shaped groove 798 for accommodating a gasket. However, it should be understood that any suitable shape may be used for the groove 798, as long as the groove 798 can accommodate the gasket to seal the fuel cell stack. The groove 798 has a depth of approximately 0.5-1 mm in the Z-direction to accommodate a sealant, a width in the X-direction of approximately 8-12 mm, and a length in the Y-direction of approximately 8-12 mm. For example, the groove 798 may have a width and length of 8×8 mm or 12×12 mm. It should be understood that the length and width of the groove 798 are both designed to be larger than the length and width of the insulating sleeve 750.

Figure 10:
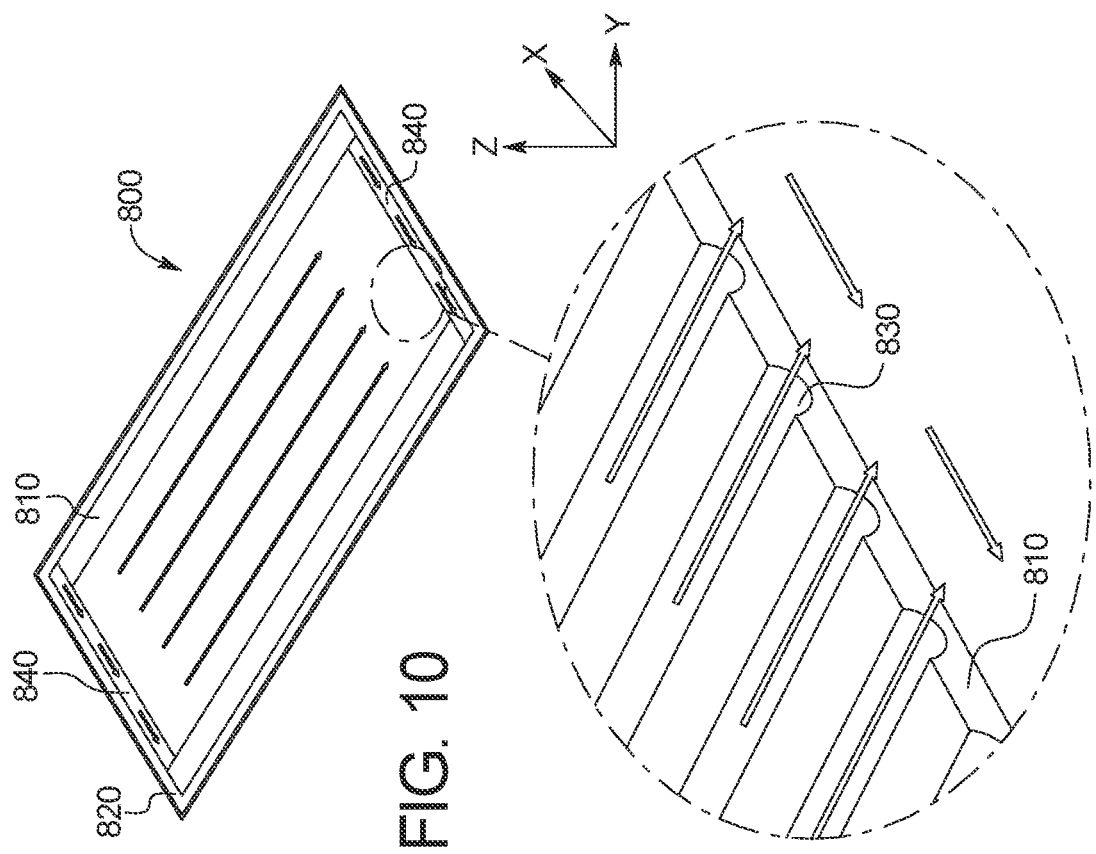
FIG. 10 is a perspective view of a cathode side bipolar plate.

FIG. 10 shows a bipolar plate 800 for a fuel cell stack in accordance with an eighth embodiment. The bipolar plate 800 includes a metal plate 810, a sealant coating 820 formed around the entire perimeter of the metal plate 810, a plurality of semi-circular air flow channels 830 formed on a surface of the metal plate 810, and grooves 840 formed on opposite edges of the bipolar plate with respect to the Y-direction.

The metal plate 810 can be any suitable metal for a bipolar plate. For example, the metal plate 810 can be formed of a stainless steel material, such as SS 330, SS 441 or Crofer 22, preferably SS 441. A total width of the bipolar plate 810 in the X-direction ranges from 10 cm to 50 cm, and is preferably 20 cm.

The entire perimeter of the metal plate 810 is covered by sealant coating 820 that seals the metal plate 810. The sealant coating 820 is an insulating material and preferably includes a YSZ ceramic. The sealant coating 820 can also contain glass to prevent fusion at low temperatures of less than 700° C. Any suitable insulating material may be used as the sealant coating 820, as long as the insulating material can be coated on the metal plate 810 at a temperature of less than 700° C. For example, the sealant coating 820 can include at least one of: silicate glass, a silicate/glass-ceramic, a Ba—Al—B—La silicate/glass-ceramic, and a Sr—Ca—B—Zn—Ti silicate glass-ceramic. The sealant coating 820 has a thickness of approximately 10 µm to 20 µm.

The semi-circular air flow channels 830 are formed as cavities in the top surface of the metal plate 810. The semi-circular air flow channels 830 have a rounded shape with no defined edge as shown in FIG. 10. The semi-circular air flow channels 830 each have a width or diameter of approximately 10 µm to 500 µm, preferably 100 µm to 250 µm, in the X-direction and a height of approximately 10 µm to 500 µm, preferably 100 µm to 250 µm, in the Z-direction. The semi-circular air flow channels 830 are spaced apart on the top surface of the metal plate 810 at regular intervals of approximately 10 µm to 500 µm, preferably 100 µm to 250 µm, between each of the semi-circular air flow channels 830. However, it should be understood that the semi-circular air flow channels 830 can include only one channel or can be formed at irregular intervals along the top and bottom surfaces of the metal plate 810.

The grooves 840 allow air to flow from the semi-circular air flow channels 830 to an exterior of a fuel cell. In this manner, the grooves 840 allow air to flow between fuel cells in a fuel cell stack that includes the bipolar plate 800. In particular, when the bipolar plate 800 is incorporated into a fuel cell stack that includes hollow fasteners in accordance with an embodiment, the grooves 840 can align with air holes in the hollow fastener to allow for air distribution throughout the fuel cell stack. The grooves 840 have a width of approximately 80 mm in the X-direction and a length of approximately 5 mm in the Y-direction.

Figure 11:
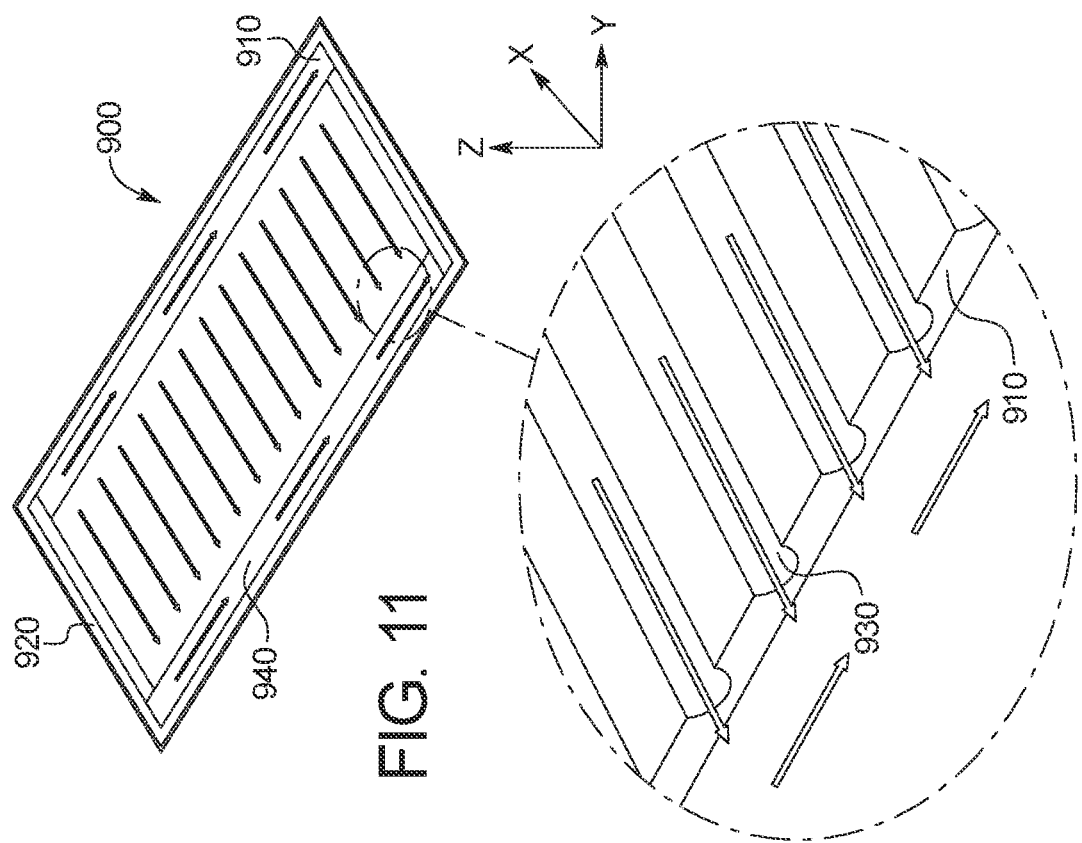
FIG. 11 is a perspective view of an anode side bipolar plate.

FIG. 11 shows a bipolar plate 900 for a fuel cell stack according to a ninth embodiment. The bipolar plate 900 includes a metal plate 910, a sealant coating 920 formed around the entire perimeter of the metal plate 910, a plurality of semi-circular fuel flow channels 940 formed on a surface of the metal plate 910, and grooves 940 formed on opposite edges of the bipolar plate with respect to the Y-direction.

The metal plate 910 can be any suitable metal for a bipolar plate. For example, the metal plate 910 can be formed of a stainless steel material, such as SS 330, SS 441 or Crofer 22, preferably SS 441. A total width of the bipolar plate 910 in the X-direction ranges from 10 cm to 50 cm, and is preferably 20 cm.

The entire perimeter of the metal plate 910 is covered by sealant coating 920 that seals the metal plate 910. The sealant coating 920 is an insulating material and preferably includes a YSZ ceramic. The sealant coating 920 can also contain glass to prevent fusion at low temperatures of less than 700° C. Any suitable insulating material may be used as the sealant coating 920, as long as the insulating material can be coated on the metal plate 910 at a temperature of less than 700° C. For example, the sealant coating 920 can include at least one of: silicate glass, a silicate/glass-ceramic, a Ba—Al—B—La silicate/glass-ceramic, and a Sr—Ca—B—Zn—Ti silicate glass-ceramic. The sealant coating 920 has a thickness of approximately 10 µm to 20 µm.

The semi-circular fuel flow channels 930 are formed as cavities in the top surface of the metal plate 910. The semi-circular fuel flow channels 930 have a rounded shape with no defined edge as shown in FIG. 11. The semi-circular fuel flow channels 930 each have a width or diameter of approximately 10 µm to 500 µm, preferably 100 µm to 250 µm, in the X-direction and a height of approximately 10 µm to 500 µm, preferably 100 µm to 250 µm, in the Z-direction. The semi-circular fuel flow channels 930 are spaced apart on the top surface of the metal plate 810 at regular intervals of approximately 10 µm to 500 µm, preferably 100 µm to 250 µm, between each of the semi-circular fuel flow channels 930. However, it should be understood that the semi-circular fuel flow channels 930 can include only one channel or can be formed at irregular intervals along the top and bottom surfaces of the metal plate 910.

The grooves 940 allow fuel to flow from the semi-circular fuel flow channels 930 to an exterior of a fuel cell. In this manner, the grooves 940 allow fuel to flow between fuel cells in a fuel cell stack that includes the bipolar plate 900. In particular, when the bipolar plate 900 is incorporated into a fuel cell stack that includes hollow fasteners in accordance with an embodiment, the grooves 940 can align with fuel holes in the hollow fastener to allow for fuel distribution throughout the fuel cell stack. The grooves 940 have a width of approximately 5 mm in the X-direction and a length of approximately 170 mm in the Y-direction.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A fuel cell stack comprising:
a top end plate;
a bottom end plate;
a plurality of fuel cells provided between the top end plate and the bottom end plate;
at least one bipolar plate, each of the at least one bipolar plate formed between two of the plurality of fuel cells;
a plurality of hollow fasteners extending through holes in each of the top end plate, the bottom end plate, the plurality of fuel cells and the at least one bipolar plate; and
a plurality of sleeves extending through the holes in each of the top end plate, the bottom end plate, the plurality of fuel cells and the at least one bipolar plate, each of the plurality of sleeves surrounding one of the plurality of hollow fasteners,
each of the plurality of hollow fasteners comprising: a top surface, a hole in the top surface, a side surface, and a plurality of holes formed in the side surface.

2. The fuel cell stack according to claim 1, wherein the top end plate and the bottom end plate are each covered by a first coating comprising a ceramic material.

3. The fuel cell stack according to claim 2, wherein each of the plurality of hollow fasteners is covered by a second coating comprising a first insulating material.

4. The fuel cell stack according to claim 3, wherein the first coating and the second coating are formed of a same material.

5. The fuel cell stack according to claim 1, wherein each of the plurality of sleeves is formed of a second insulating material.

6. The fuel cell stack according to claim 1, further comprising
for each of the plurality of sleeves, a gap between each of the plurality of sleeves and the one of the plurality of hollow fasteners.

7. The fuel cell stack according to claim 1, further comprising
a sealing gasket between each of the plurality of sleeves and the plurality of fuel cells.

8. The fuel cell stack according to claim 1, wherein each of the plurality of fuel cells includes an anode comprising: a metal substrate having at least one hole formed therein; and an anode material formed on a surface of the metal substrate and within each of the at least one hole, and
each of the plurality of hollow fasteners penetrates the metal substrate of each of the plurality of fuel cells.

9. The fuel cell stack according to claim 1, wherein each of the plurality of fuel cells includes a solid oxide electrolyte.

10. The fuel cell stack according to claim 1, wherein each of the at least one bipolar plates includes at least one channel formed in a first surface and a second surface of each of the at least one bipolar plates, and each of the at least one channels has a semi-circular shape and extends along the first surface and the second surface of each of the at least one bipolar plates.

11. The fuel cell stack according to claim 10, wherein each of the at least one bipolar plates includes a third coating that covers the first surface and the second surface of each of the at least one bipolar plates.

12. The fuel cell stack according to claim 1, wherein for each of the plurality of hollow fasteners, the hole in the top surface forms a gas flow channel along a center axis of each of the plurality of hollow fasteners.

13. The fuel cell stack according to claim 12, wherein for each of the plurality of hollow fasteners, the plurality of holes formed in the side surface connect the gas flow channel to an exterior of each of the plurality of hollow fasteners.

14. The fuel cell stack according to claim 1, further comprising a positive electrode terminal and a negative electrode terminal between the top end plate and the bottom end plate.

15. The fuel cell stack according to claim 1, further comprising
a metal mesh formed between one of the at least one bipolar plate and a first one of the plurality of fuel cells; and
a second metal mesh formed between the one of the at least one bipolar plate and a second one of the plurality of fuel cells.

16. The fuel cell stack according to claim 10, wherein
each of the plurality of sleeves includes a first channel that aligns with the at least one channel on the first surface of each of the at least one bipolar plates and a second channel that aligns with the at least one channel on the second surface of each of the at least one bipolar plates.

17. The fuel cell stack according to claim 16, wherein
the first channel and the second channel are each aligned with one of the plurality of holes formed in one of the plurality of hollow fasteners.

18. The fuel cell stack according to claim 17, wherein
the first channel and the second channel each extend through an entire thickness of each of the plurality of sleeves,
each of the plurality of sleeves includes grooves adjacent to the first channel and the second channel, and
the grooves do not extend through the entire thickness of each of the plurality of sleeves.

19. The fuel cell stack according to claim 1, wherein the hollow fastener is a metal screw.

\* \* \* \* \*